United States Patent [19]
Kim et al.

[11] Patent Number: 6,040,936
[45] Date of Patent: Mar. 21, 2000

[54] OPTICAL TRANSMISSION CONTROL APPARATUS UTILIZING METAL FILMS PERFORATED WITH SUBWAVELENGTH-DIAMETER HOLES

[75] Inventors: Tae Jin Kim, Plainsboro; Tineke Thio, Princeton; Thomas Wren Ebbesen, Plainsboro, all of N.J.

[73] Assignee: NEC Research Institute, Inc., Princeton, N.J.

[21] Appl. No.: 09/168,265

[22] Filed: Oct. 8, 1998

[51] Int. Cl.[7] .................................. G02F 1/03; G09G 3/36
[52] U.S. Cl. .......................... 359/245; 359/250; 359/251; 359/252; 359/279; 359/569; 359/345; 359/88
[58] Field of Search .................................... 359/245, 250, 359/251, 252, 279, 569; 250/216; 345/88; 356/356

[56] References Cited

U.S. PATENT DOCUMENTS

| | | | |
|---|---|---|---|
| 3,866,037 | 2/1975 | Simpson | 250/216 |
| 4,360,273 | 11/1982 | Thaxter | 356/354 |
| 4,405,238 | 9/1983 | Grobman et al. | 356/401 |
| 4,411,013 | 10/1983 | Takasu et al. | 378/34 |
| 4,659,429 | 4/1987 | Isaacson et al. | 216/24 |
| 4,662,747 | 5/1987 | Isaacson et al. | 356/317 |
| 4,815,854 | 3/1989 | Tanaka et al. | 356/356 |
| 4,891,830 | 1/1990 | Iwahashi | 378/35 |
| 5,250,812 | 10/1993 | Murai et al. | 250/492.2 |
| 5,306,902 | 4/1994 | Goodman | 250/201.3 |
| 5,351,127 | 9/1994 | King et al. | 356/445 |
| 5,354,985 | 10/1994 | Quate | 250/234 |
| 5,451,980 | 9/1995 | Simon et al. | 345/88 |
| 5,570,139 | 10/1996 | Wang | 359/245 |
| 5,633,972 | 5/1997 | Walt et al. | 385/116 |
| 5,663,798 | 9/1997 | Karrai | 356/384 |
| 5,789,742 | 8/1998 | Wolff | 250/227.11 |
| 5,933,233 | 8/1999 | Gunther | 356/318 |
| 5,973,316 | 10/1999 | Ebbesen et al. | 250/216 |

FOREIGN PATENT DOCUMENTS 405240787A 9/1993 Japan.

OTHER PUBLICATIONS

Bethe, H. A., "Theory of Diffraction by Small Holes," *The Physical Review*, vol. 66, Nos. 7 and 8, pp. 163–182 (Oct. 1944).

Caldwell, M. E. et al., "Surface–plasmon spatial light modulators based on liquid crystal," *Applied Optics*, vol. 31, No. 20, pp. 3880–3891 (Jul. 1992).

Chown, M., "Tight fit," *New Scientist*, No. 2121 (Feb. 1998).

Cowan, J. J., "Aztec surface–relief volume diffractive structure," *Journal of the Optical Society of America*, vol. 7, No. 8, pp. 1529–1544 (Aug. 1990).

Ebbesen, T.W. et al., "Extraordinary optical transmission through sub–wavelength hole arrays," *Nature*, vol. 391, pp. 667–669 (Feb. 1998).

(List continued on next page.)

*Primary Examiner*—Georgia Epps
*Assistant Examiner*—Evelyn A. Lester
*Attorney, Agent, or Firm*—Andrew G. Isztwan

[57] ABSTRACT

Generally speaking, in accordance with the invention, an optical transmission modulation apparatus is provided for modulating light transmitted through the apparatus. The apparatus comprises a metal film having a periodic array of subwavelength-diameter holes provided therein, and a supporting layer. At least a portion of the supporting layer has a selectively variable refractive index, the selectively variable refractive index portion being substantially adjacent to the metal film such that the metal film and the supporting layer form a perforated metal film unit. Selective variation of the refractive index of the selectively variable refractive index portion modulates the intensity of the light transmitted through the perforated metal film unit without substantially changing the direction of the light. Flat panel displays, spatial light modulators and tunable optical filters based on the optical transmission control apparatus are also provided.

71 Claims, 14 Drawing Sheets

OTHER PUBLICATIONS

Evans, A. F. et al., "Measurement of the electrically induced refractive index change in silicon for wavelength $\lambda=1.3\ \mu m$ using a Schottky diode," *Applied Physics Letters*, vol. 56, No. 3, pp. 212–214 (Jan. 1990).

Haginoya, C. et al., "Nanostructure array fabrication with a size–controllable natural lithography," *Applied Physics Letters*, vol. 71, No. 20, pp. 2934–2936 (Nov. 1997).

Lezec, H., "Light Squeeze," *Science NOW* (Feb. 11, 1998).

Ghaemi, H. F. et al., "Surface plasmons enhance optical transmission through subwavelength holes," *Physical Review B*, vol. 58, No. 11, pp. 6779–6782 (Sep. 1998).

Ordal, M. A. et al., "Optical properties of the metals Al, Co, Cu, Au, Fe, Pb, Ni, Pd, Pt, Ag, Ti and W in the infrared and far infrared," *Applied Optics*, vol. 22, No. 7, pp. 1099–1119 (Apr. 1983).

Raether, H., *Surface Plasmons on Smooth and Rough Surfaces and on Gratings*, Springer–Verlag, pp. 1–136 (1988).

Sambles, R., "More than transparent," *Nature*, vol. 391, pp. 641–642 (Feb. 1998).

Solgaard, O. et al., "High frequency attenuated total internal reflection light modulator," *Applied Physics Letters*, vol. 61, No. 21, pp. 2500–2502 (Nov. 1992).

Van Belle, M., "Photons Squeeze Through Tiny Holes," *Photonics Spectra*, pp. 36–37 (May 1998).

Villeneuve, P. R., "Light beats the diffraction limit," *Physics World*, pp. 28–29 (Apr. 1998).

Wang, Y., "Voltage–induced color–selective absorption with surface plasmons," *Applied Physics Letters*, vol. 67, No. 19, pp. 2759–2761 (Nov. 1995).

Weber, W. H. et al., "Optical electric–field enhancement at a metal surface arising from surface–plasmon excitation," *Optics Letters*, vol. 6, No. 3, pp. 122–124 (Mar. 1981).

Boardman, A.D. (ed.), *Electromagnetic Surface Modes*, Wiley–Interscience Publication, pp. 1–76, 661–724 (1982).

Wood, R. W., "Anomalous Diffraction Gratings," *Physical Review*, vol. 48, pp. 928–936 (Dec. 1935).

Wood, R. W., "On a Remarkable Case of Uneven Distribution of Light in a Diffraction Grating Spectrum," *Philosophical Magazine*, vol. 4, pp. 396–403 (Jun. 1902).

Yeatman, E. M. et al., "Spatial light modulation using surface plasmon resonance," *Applied Physics Letters* vol. 55, No. 7, pp. 613–615 (Aug. 1989).

"Flooding light through tiny holes," *Science News*, vol. 153, No. 9 (Feb. 1998).

"Startling Amount of Light Gets Through Tiny Holes," John Wiley & Sons (1998).

Botten, L.C. et al., "Inductive Grids in the Resonant Region: Theory and Experiment," *International Journal of Infrared and Millimeter Waves*, vol. 6, No. 7, pp. 511–575 (1985).

Ulrich, R., "Far–Infrared Properties of Metallic Mesh and Its Complementary Structure," *Infrared Phyics*, vol. 7, pp. 37–55 (1967).

John, S., "Localization of Light", *Physics Today*, p. 32 (May 1991).

Yablonovitch, E. et al., "Hope for Photonic Bandgaps," *Nature*, vol. 351, p. 278 (1991).

Dalichaouch, R. et al., "Microwave Localization by Two–Dimensional Random Scattering," *Nature*, vol. 354, pp. 53–55 (1991).

Joannopoulus, J.D. et al., *Photonic Crystals*, Princeton University Press, pp. 4–7 (1995).

Haroche, S. et al., "Cavity Quantum Electrodynamics," *Physics Today*, pp. 24–30 (Jan. 1989).

Betzig, E. et al., "Near–Field Optics: Microscopy, Spectroscopy and Surface Modification Beyond the Diffraction Limit," *Science*, vol. 189, pp. 189–194 (1992).

Born, M. et al., *Principles of Optics*, Pergamon Press, pp. 401–409 (1980).

Ritchie, R.H. et al., "Surface–Plasmon Resonance Effect in Grating Diffraction," *Physical Review Letters*, vol. 21, No. 22, pp. 1530–1553 (1968).

Chen, Y.J. et al., "Surface Plasmons on Gratings: Coupling in the Minigap Regions," *Solid State Communications*, vol. 46, No. 2, pp. 95–99 (1983).

Kitson, S.C. et al., "Full Photonic Band Gap for Surface Modes in the Visible," *Physical Review Letters*, vol. 77, No. 13, pp. 2670–2673 (1996).

Lochbihler, H. et al., "Surface Polaritons on Gold–Wire Gratings," *Physical Review B*, vol. 50, No. 7, pp. 4795–4801 (1994).

Drexehage, K.H., "Interaction of Light with Monomolecular Dye Layers," *Progress in Optics*, vol. 12, pp. 165–232 (1974).

Roberts, A., "Near–zone fields behind circular apertures in thick, perfectly conducting screens," *Journal of Applied Physics*, vol. 65, No. 8, pp. 2896–2899 (1989).

Roberts, A., "Small–hole coupling of radiation into a near–field probe," *Journal of Applied Physics*, vol. 70, No. 8, pp. 4045–4049 (1991).

Wessel, J., "Surface–enhanced optical microscopy", *Journal of the Optical Society of America B*, vol. 2, No. 9, pp. 1538–1541 (1985).

Fischer, U., "Submicrometer aperture in a thin metal film as a probe of its microenvironment through enhanced light scattering and fluorescence", *Journal of the Optical Society of America B*, vol. 3, No. 10, pp. 1239–1244, (1986).

Specht, M. et al., "Scanning plasmon near–field microscope," *Physical Review Letters*, vol. 68, No. 4, pp. 476–497 (1992).

Ulrich, R., "Interference Filters for the Far Infrared," *Applied Optics*, vol. 7, No. 10, pp. 1987–1996 (1968).

Sakai, K. et al., "Metallic Mesh Bandpass Filters and Fabry–Perot Interferometer for the Far Infrared," *Japanese Journal of Applied Physics*, vol. 8, No. 8, pp. 1046–1055 (1969).

Renk, K.F. et al., "Interference Filters and Fabry–Perot Interferometers for the Far Infrared", *Applied Optics*, vol. 1, No. 5, pp. 643–648 (1962).

Garg, R.K. et al, "Far–infrared characteristics of multi–element interference filters using different grids," *Infrared Physics*, vol. 18, pp. 292–298 (1978).

Chase, S.T. et al., "Resonant array bandpass filters for the far infrared," *Applied Optics*, vol. 22, No. 1, pp. 1775–1779 (1983).

Larsen, T., "A Survey of the Theory of Wire Grids," *IRE Transactions on Microwave Theory & Techniques*, pp. 191–201 (1962).

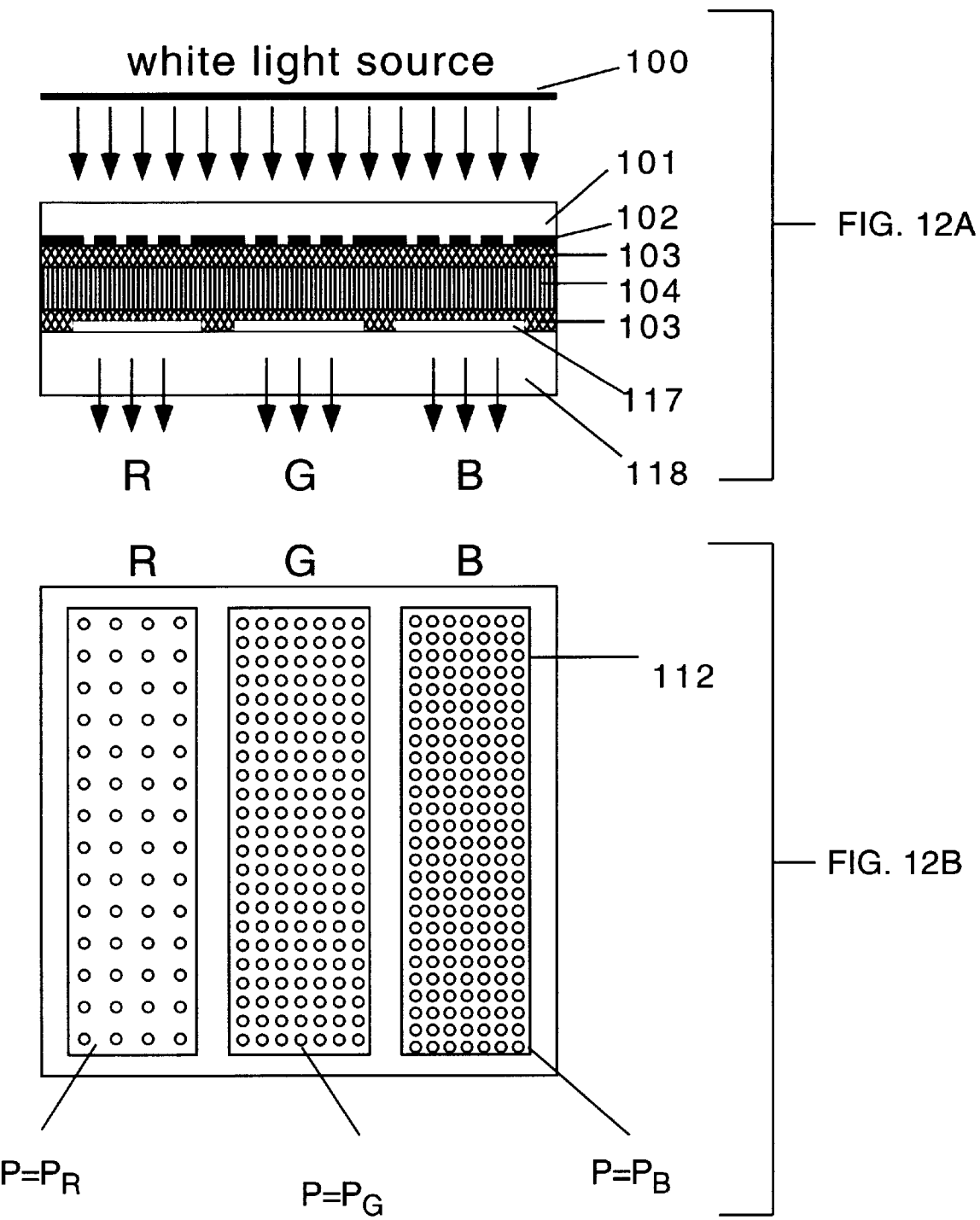

OPTICAL TRANSMISSION CONTROL APPARATUS UTILIZING METAL FILMS PERFORATED WITH SUBWAVELENGTH-DIAMETER HOLES

FIELD OF THE INVENTION

The present invention relates to the field of optics, and in particular to the control of the intensity and wavelength of light transmitted through a thin metal film perforated with holes.

BACKGROUND OF THE INVENTION

A smooth metal film having a thickness which is larger than its optical skin depth (the depth that the electromagnetic fields from incident light penetrate into the material where the electric field intensity drops to $1/e^2$, typically about 20 nm to 30 nm for a metal) is opaque to light at frequencies below the bulk plasma frequency $\omega_p$, which is given by $\omega_p^2 = (4\pi n e^2)/m^*$, where n is the electron density, e is the electron charge, and $m^*$ is the effective mass. A single hole in such a metal film transmits light with an efficiency which depends on the diameter of the hole. If the hole diameter is smaller than the wavelength of light passing through the hole, the transmission is proportional to $(d/\lambda)^4$. See H. A. Bethe, "Theory of Diffraction by Small Holes", *Physical Review*, Second Series, Vol. 66, Nos. 7 and 8, pp. 163–182 (1944). For this reason, the optical throughput of near-field optical devices is extremely low.

Recently, a strong enhancement of optical transmission has been demonstrated using a metal film perforated with an array of subwavelength-diameter holes. See T. W. Ebbesen et al., "Extraordinary optical transmission through subwavelength hole arrays," *Nature*, Vol. 391, pp. 667–669 (Feb. 12, 1998). This enhancement, which can be as large as a factor of 1,000, occurs when light incident on the metal film interacts resonantly with a surface plasmon mode. Surface plasmons (also referred to herein as simply "plasmons") are collective electronic excitations which exist at the interface of a metal with an adjacent dielectric medium. See H. Raether, *Surface Plasmons on Smooth and Rough Surfaces and on Gratings*, Vol. 111 of *Springer Tracts in Modern Physics* (Springer-Verlag, Berlin, 1988); A. D. Boardman (ed.), *Electromagnetic Surface Modes*, Chs. 1, 17, pp. 1–77, 661–725 (John Wiley & Sons, 1982). The periodic structure of the hole arrays allows the surface plasmons to couple with the incident light.

On the other hand, the periodic array of holes also has properties similar to those of a diffraction grating (see Ebbesen et al., supra), including the presence of Wood's anomaly (see R. W. Wood, "On a Remarkable Case of Uneven Distribution of Light in a Diffraction Grating Spectrum", *Philosophical Magazine*, Vol. 4, pp. 396–402 (1902), and R. W. Wood, "Anomalous Diffraction Gratings", *Physical Review*, Vol. 48, pp. 928–936 (1935)) which causes deep, sharp minima in the zero-order transmission when a higher-order diffracted beam becomes tangent to the metal film. The combination of these two effects (the surface plasmon coupling and Wood's anomaly) gives rise to well-defined maxima and minima in the zero-order transmission spectra. These maxima and minima exist at wavelengths which are determined by the geometry, both of the hole array and that of the incident light, and the refractive index of the adjacent dielectric media. See Ebbesen et al., supra.

The present invention utilizes the properties of a metal film perforated with an array of subwavelength-diameter holes to provide novel apparatus which are capable of controlling the intensity and wavelength of transmitted light. In particular, the invention includes novel thin display units (which can be used in flat panel displays), spatial light modulators, and tunable filters.

SUMMARY OF THE INVENTION

Generally speaking, in accordance with the invention, an optical transmission modulation apparatus for modulating light transmitted through the apparatus is provided. The apparatus comprises a metal film having a periodic array of subwavelength-diameter holes provided therein, and a supporting layer. At least a portion of the supporting layer has a selectively variable refractive index, the selectively variable refractive index portion being substantially adjacent to the metal film such that the metal film and the supporting layer comprise a perforated metal film unit. Selective variation of the refractive index of the selectively variable refractive index portion modulates the intensity of the light transmitted through the perforated metal film unit without substantially changing the direction of the light.

In another embodiment of the invention, a flat panel display having a plurality of display cells is provided. The flat panel display comprises a light source, a metal film having a periodic array of subwavelength-diameter holes provided therein, and a supporting layer. At least a portion of the supporting layer has a refractive index which is selectively variable for each display cell, the selectively variable refractive index portion being substantially adjacent to the metal film such that the metal film and the supporting layer comprise a perforated metal film unit. Selective variation of the refractive index of the selectively variable refractive index portion modulates the intensity of light emitted by the light source which is transmitted through the perforated metal film unit for each display cell.

In still another embodiment of the invention, a spatial light modulator having a plurality of cells and modulating the intensity of incident light as the light is transmitted through each cell of the modulator is provided. The spatial light modulator comprises a metal film having a periodic array of subwavelength-diameter holes provided therein, and a supporting layer. At least a portion of the supporting layer has a refractive index which is selectively variable for each cell, the selectively variable refractive index portion being substantially adjacent to the metal film such that the metal film and the supporting layer comprise a perforated metal film unit. Selective variation of the refractive index of the selectively variable refractive index portion of the supporting layer modulates the intensity of light transmitted through the perforated metal film unit for each cell without substantially changing the direction of the light.

In yet another embodiment of the invention, a tunable optical filter for modulating the intensity of incident light as the light is transmitted through the tunable optical filter is provided. The tunable optical filter comprises a metal film having a periodic array of subwavelength-diameter holes provided therein, and a supporting layer. At least a portion of the supporting layer has a selectively variable refractive index, the selectively variable refractive index portion being substantially adjacent to the metal film such that the metal film and the supporting layer comprise a perforated metal film unit. Selective variation of the refractive index of the selectively variable refractive index portion of the supporting layer modulates the intensity of light transmitted through the perforated metal film unit without substantially changing the direction of the light. The tunable filter may also be provided with a plurality of cells, wherein the wavelengths of lights transmitted through each cell may be selectively controlled or tuned.

Accordingly, an object of the invention is to provide optical transmission modulation apparatus which control the intensity of transmitted light.

Another object of the invention is to provide optical transmission modulation apparatus which control the color of transmitted light.

A further object of the invention is to provide optical transmission modulation apparatus which exhibit enhanced transmission efficiency.

A still further object of the invention is to provide optical transmission modulation apparatus which are very thin and are potentially mechanically flexible.

A still further object of the invention is to provide a flat panel display which has high transmission efficiency, is potentially thin and flexible, does not require costly, bulky and complex polarizers and analyzers.

A still further object of the invention is to provide a spatial light modulator and an optical tuner which have high transmission efficiency and are potentially thin and flexible Other objects of the present invention will become more readily apparent in light of the following description in conjunction with the accompanying drawings.

BRIEF DESCRIPTION OF THE DRAWINGS

FIG. 12A is a cross-sectional view of one display pixel, comprising red, green and blue display cells, in a flat panel display of the present invention, which uses the size and periodicity of holes in a perforated metal film for color control;

FIG. 12B is a plan view of the arrays of subwavelength-diameter holes provided in the perforated metal film for the display pixel shown in FIG. 12A, illustrating the different periodicities used to generate each of the colors red, green and blue for the display pixel;

DETAILED DESCRIPTION OF THE PREFERRED EMBODIMENTS

Figure 1:
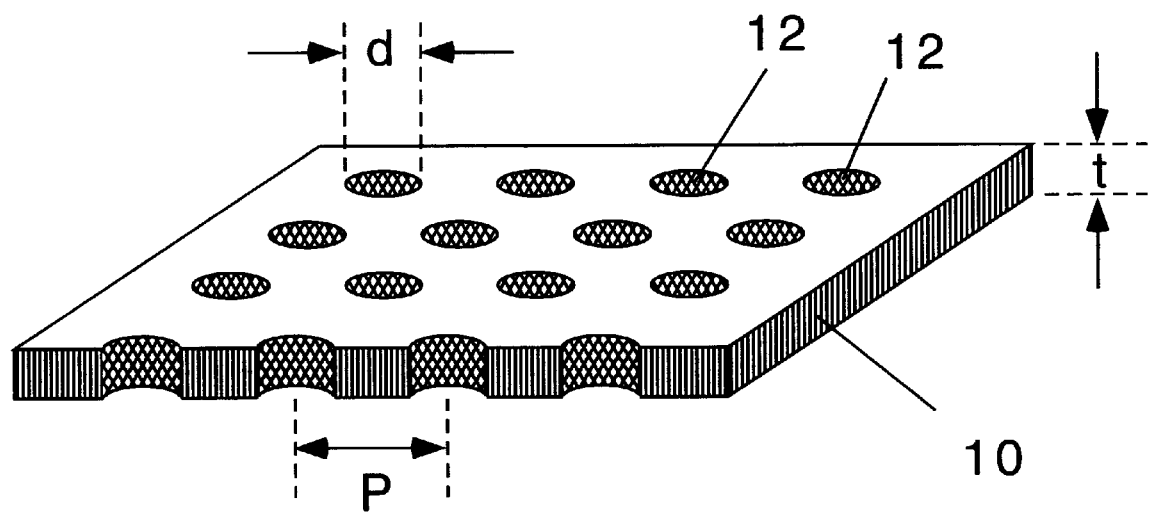
FIG. 1 is a perspective view of a metal film perforated with subwavelength-diameter holes constructed in accordance with the present invention.

The invention utilizes a metal film which is perforated with a periodic array of subwavelength-diameter holes. Referring now to the figures and to FIG. 1 in particular, there is shown (not to scale) a metal film 10 containing a rectangular array of cylindrical subwavelength-diameter holes 12. Metal film 10 may comprise a metal film or a metal plate. The metal of metal film 10 may be any metal, and selecting a preferable metal will depend on particular applications and design requirements. Preferable metals can include aluminum (which is inexpensive), silver, gold (which is noble) or chromium (which is hard). Metal film 10 may also be constructed of a heavily doped semiconductor.

As also shown in FIG. 1, the diameter of a subwavelength-diameter hole is d and the periodicity or spacing between apertures is P. Metal film 10 must be optically thick (that is, opaque to light), and is preferably approximately 5 times the skin depth. Both transmission maxima and width will decrease as the thickness t of metal film 10 increases. While the subwavelength-diameter holes 12 are shown as having a round shape in FIG. 1, they may have other shapes, such as oval or rectangular. While the array is shown as a rectangular array, other hole array configurations are also possible, such as triangular, without deviating from the teachings of the invention.

In the experiments described below, the metal film was perforated using a focused ion beam using gallium ions. This method, like electron-beam fabrication, is highly versatile but very slow since the holes must be created sequentially (i.e. one at a time). In order to create large devices incorporating large-area perforated metals films, it is preferable either to use large-area contact printing methods such as holographic embossing technology, or to use self-assembly of polymer spheres at the surface of a substrate. A monolayer of such spheres, self-arranged in a hexagonal close-packed array, can be used as a mask pattern for fabricating the holes. See C. Haginoya et al., "Nanostructure array fabrication with a size-controllable natural lithography," *Applied Physics Letters,* Vol. 71, No. 20, pp. 2934–2936 (Nov. 17, 1997).

Figure 2A:
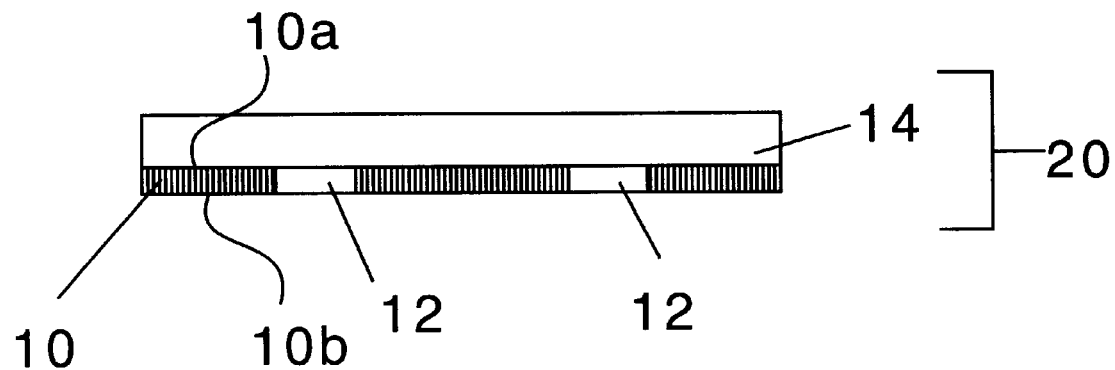
FIG. 2A is a cross-sectional diagram of a perforated metal film unit constructed in accordance with the present invention, wherein the metal film is substantially adjacent to a selectively variable refractive index portion of a supporting layer on one side of the metal film.
Figure 2B:
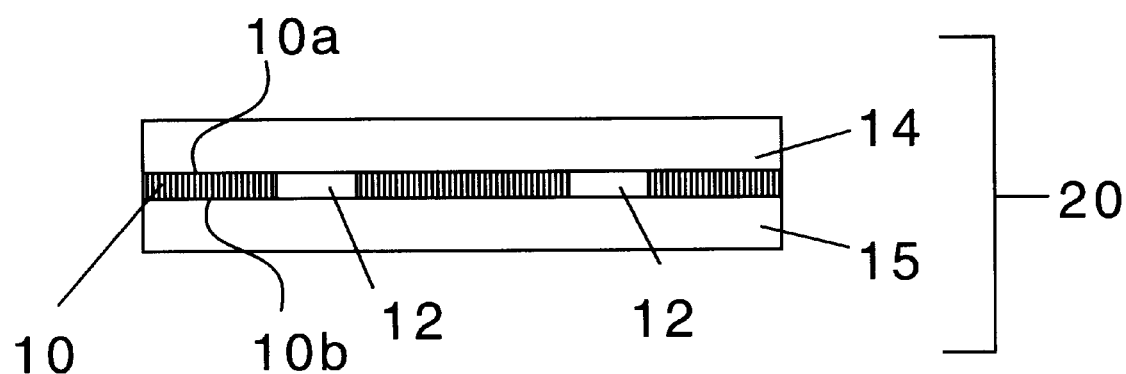
FIG. 2B is a cross-sectional diagram of a perforated metal film unit constructed in accordance with the present invention, wherein the metal film is substantially adjacent to a selectively variable refractive index portion of a supporting layer on one side of the metal film, an auxiliary layer being substantially adjacent to the other side of the metal film.

FIG. 2A shows a cross-section of a perforated metal film unit 20 of the present invention. Perforated metal film unit 20 includes the metal film 10 perforated with an array of subwavelength-diameter holes 12, and a supporting layer 14. Supporting layer 14 includes at least a portion having a selectively variable refractive index, such as a liquid crystal layer as described below. A first side 10a of metal film 10 is substantially adjacent to a selectively variable refractive index portion of a supporting layer 14. Supporting layer 14 may be comprised of a single layer of material or several layers of homogeneous or heterogeneous materials (such as the LC layers and the transparent conducting layers which will be discussed below). Supporting layer 14 may be any thickness, so long as it is mechanically stable and generally transparent to light, and may be either rigid or flexible. A second side 10b of the metal film 10 may be left uncovered and exposed to air or the like as shown in FIG. 2A. Alternatively, metal film 10 may instead be substantially adjacent on its second side 10b to one or more auxiliary layers 15 as shown in FIG. 2B, such as a quartz or polymer substrate. In the case shown in FIG. 2B, the metal film 10 is therefore "sandwiched" between the supporting layer 14 and the auxiliary layer or layers 15.

As used herein, "substantially adjacent" generally means either directly in contact with or in close proximity to. In the particular case of the relationship of the metal film 10 to the supporting layer 14 in a perforated metal film unit 20, in which the supporting layer 14 includes a selectively variable refractive index portion, "substantially adjacent" means that either: (1) the selectively variable refractive index portion is in direct contact with the metal film, or (2) the length of any gap between the metal film and the selectively variable refractive index portion of the supporting layer (such as a liquid crystal solution layer as described below) is less than the depth at which the surface plasmons of the metal film surface penetrate the medium in the gap (the medium in the gap may be a vacuum, air, or some other dielectric material, each of which would have a characteristic surface plasmon penetration depth). That is, the surface plasmons in the metal film must penetrate to the selectively variable refractive index portion of the supporting layer. Accordingly, the selectively variable refractive index portion of the supporting layer 14, which is substantially adjacent to metal film 10, may therefore be directly in contact with metal film 10, or may be in close proximity to it in the sense noted above. For example, a spacing between the metal film 10 and the selectively variable refractive index portion of the supporting layer 14 of 0 nm to about 200 nm is typically acceptable (200 nm corresponding to the surface plasmon penetration depth of a typical intervening dielectric material disposed in the gap between the metal film 10 and the selectively variable refractive index portion of the supporting layer 14)), although this particular exemplary range is in no way intended to limit the scope of the invention.

The term "perforated metal film unit" will be used herein to refer to the combination of the metal film 10 perforated with subwavelength-diameter holes and any supporting layer 14 having a selectively variable refractive index portion which is substantially adjacent to the metal film 10. Such a perforated metal film unit may or may not also include one or more auxiliary layers 15.

Before describing the additional components of the invention in detail, the physical principles which give rise to enhanced optical transmission through a metal film perforated with a periodic array of subwavelength-diameter holes, and which yield well-defined transmission minima, will be discussed to enhance understanding of the operation of the invention.

Figure 3:
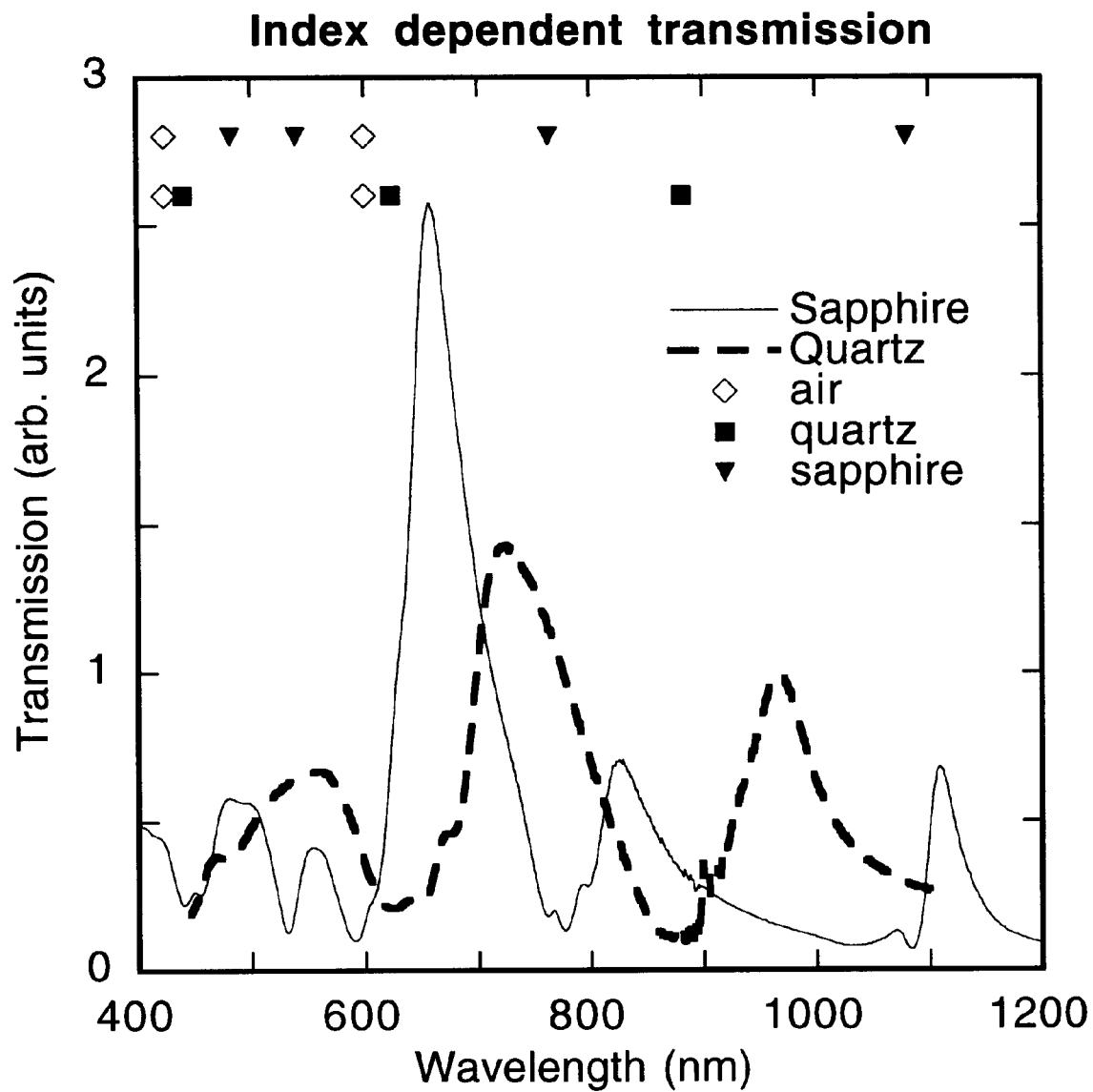
FIG. 3 is a graph showing zero-order transmission spectra of two perforated metal film units including a silver film perforated with subwavelength-diameter holes, d=150 nm, according to the present invention, both with a subwavelength-diameter hole periodicity of P=600 nm, one perforated metal film unit having a quartz supporting layer (thick dashed line), and the other perforated metal film unit having a sapphire supporting layer (thin solid line)

The zero-order transmission spectrum of such a perforated metal film unit are shown in FIG. 3, for cases in which the supporting layer 14 is comprised of a layer of either sapphire or quartz. The markers in FIG. 3 indicated the positions of Wood's anomaly at which the transmission should be minimal (see Equation (4)), for the metal-air (open diamonds), metal-quartz (solid squares) and metal-sapphire (solid inverted triangles) interfaces. Markers for positions of maxima are omitted for clarity. These maxima result from a resonant interaction of incident light with surface plasmons on both surfaces 10a and 10b of the metal film. See H. F. Ghaemi et al., "Surface Plasmons Enhance Optical Transmission Through Subwavelength Holes," *Physical Review B,* Vol. 58, No. 11, pp. 6779–6782 (Sep. 15, 1998). When the incident light is p-polarized (that is, the incident electric field is parallel to the x-axis while the perforated metal film unit is rotated about the y-axis through an angle θ), the coupling of light with surface plasmons on a metal surface with periodic structure or perforated metal surface follows momentum conservation (see H. Raether, supra):

$$\vec{k}_{sp} = \vec{k}_x + i\vec{G}_x + j\vec{G}_y \quad (1)$$

where $\vec{k}_{sp}$ is the surface plasmon wave vector; $\vec{k}_x = \hat{x}(2\pi/\lambda)\sin\theta$ is the component of the wavevector of the incident light which lies in the plane of the metal film; $\vec{G}_x$ and $\vec{G}_y$ are the reciprocal lattice vectors for a square lattice with $\vec{G}_x = \vec{G}_y = (2\pi/P)$, where P is the period of the hole arrays; θ is the angle between the incident wavevector and the surface normal of the metal film; and i and j are integers. The magnitude of $\vec{k}_{sp}$ can be found from the dispersion relation (see H. Raether, supra):

$$|\vec{k}_{sp}| = \frac{\omega}{c}\sqrt{\frac{\varepsilon_m \varepsilon_d}{\varepsilon_m + \varepsilon_d}} \quad (2)$$

where ω is the angular frequency of the incident optical beam, and $\varepsilon_m$ and $\varepsilon_d$ are the dielectric constants of the metal and dielectric medium, respectively. Here, it is assumed that $\varepsilon_m < 0$ and $|\varepsilon_m| > \varepsilon_d$, which is the case for a metal below the bulk plasmon energy and also for a doped semiconductor. See H. Raether, supra; M. Ordal et al., "Optical Properties of the metals Al, Co, Cu, Au, Fe, Pb, Ni, Pd, Pt, Ag, Ti, and W in the infrared and far infrared," *Applied Optics,* Vol. 22, No. 7, pp. 1099–1119 (Apr. 1, 1983). When the transmitted intensity is plotted on a gray scale as a function of E and $k_x$, the resulting energy-momentum (E, $k_x$) diagram (also known as a "dispersion diagram") shows a set of bands of high transmission, which set of bands reproduces the surface plasmon dispersion given in Equation (2). The transmission spectra are independent of which side of the perforated metal film is illuminated, even if the substantially adjacent media are significantly different.

The minima in the transmission spectrum were identified as the result of Wood's anomaly, which occurs in diffraction gratings when a diffracted beam emerges tangent to the grating. See H. F. Ghaemi et al., supra; R. W. Wood, supra. The conditions for the occurrence of Wood's anomaly are similar to Equations (1) and (2), except that $\vec{k}_{sp}$ is replaced by the wave vector of the grazing (tangent to the grating) light, which has a magnitude given by $k_{diff}=[(2\pi n_d)/\lambda]$, where $n_d = \sqrt{\epsilon_d}$, the refractive index of the supporting layer 14 (or the auxiliary layer 15). For highly ordered arrays with small holes, the widths of the Wood's anomaly minima can be very small, and in general have been found to be limited by the resolution of the spectrometer. Wood mentioned the fact that in high quality diffraction gratings, the two sodium lines can be separated by this effect, corresponding to a wavelength resolution of 0.6 nm. Certain embodiments of the invention utilize this phenomenon by modulating the transmitted intensity with a high contrast ratio by varying the angle of incidence of light to the metal film θ over a very small amount, as will be discussed below.

The geometry dependence for the occurrence of Wood's anomaly gives a set of minima which closely follow the dispersion of the surface plasmon branches in the (E, $k_x$) diagram. Since the majority of dispersion curves traverses the (E, $k_x$) plane with finite slope, it follows that for a fixed photon energy E (or fixed wavelength), the transmitted intensity traverses maxima and minima as the angle of incidence θ is varied. Certain embodiments of the invention use this phenomenon to control either the wavelength or the amplitude of the transmitted light by varying the angle of incidence θ.

Amplitude or wavelength modulation at fixed incident angle will now be discussed, focusing on the case where the angle of incidence θ=0. At this normal incidence, the wavelengths at which the maxima occur can be found by combining Equations (1) and (2), $$\lambda_{max} = \frac{P}{\sqrt{i^2+j^2}}\sqrt{\frac{\epsilon_m \epsilon_d}{\epsilon_m + \epsilon_d}} \quad (3)$$

and similarly for the minima:

$$\lambda_{min} = \frac{P}{\sqrt{i^2+j^2}}\sqrt{\epsilon_d} \quad (4)$$

From Equation (4) it follows that the two interfaces to the metallic film are distinguishable, since $n_d=1$ for air, $n_d=1.47$ (at λ=589 nm) for the fused quartz substrate, and for the liquid crystal $n_d$ can be varied from 1.52 to 1.74.

FIG. 3 shows the transmission spectra (at normal incidence) of two perforated metal film units. The two units are identical except that in one, the supporting layer is a quartz dielectric layer (dashed line), whereas in the other the supporting layer is a sapphire dielectric layer (solid line). FIG. 3 illustrates very clearly the statement in Equation (4) that the wavelengths at which the minima occur depend linearly on the refractive index of the medium which is substantially adjacent to the metal film. In particular, maxima and minima associated with the metal-sapphire interface ($n_{sapphire}=1.80$; shown in the figure by solid, inverted triangles) occur at longer wavelengths than those associated with the metal-quartz interface ($n_{quartz}=1.47$; shown in the figure by solid squares), whereas the features associated with the metal-air interface (shown in the figure by open diamonds) occur at the same wavelengths in both structures. The small differences between the two structures are due to small differences in the periodicities of the two hole arrays in the metal film.

In metal films perforated with subwavelength-diameter holes, the width of the surface plasmon resonances is relatively small. Certain embodiments of the invention utilize this phenomenon to control the transmitted wavelength by changing the index of refraction of the adjacent medium. Conversely, at a fixed wavelength the transmitted amplitude can be modulated by changing the refractive index, such that a transmission peak is swept past the relevant wavelength, and certain embodiments of the invention utilize this phenomenon as well. The latter function can in principle be achieved with a high contrast ratio (i.e. the ratio between maximal and minimal transmission), because the extinction (i.e. the ratio of maximum to minimum transmission) around the occurrence of Wood's anomaly can be nearly complete. The following sections describe such apparatus in more detail.

Optical Transmission Modulation Apparatus Using Refractive Index Variation

Figure 4:
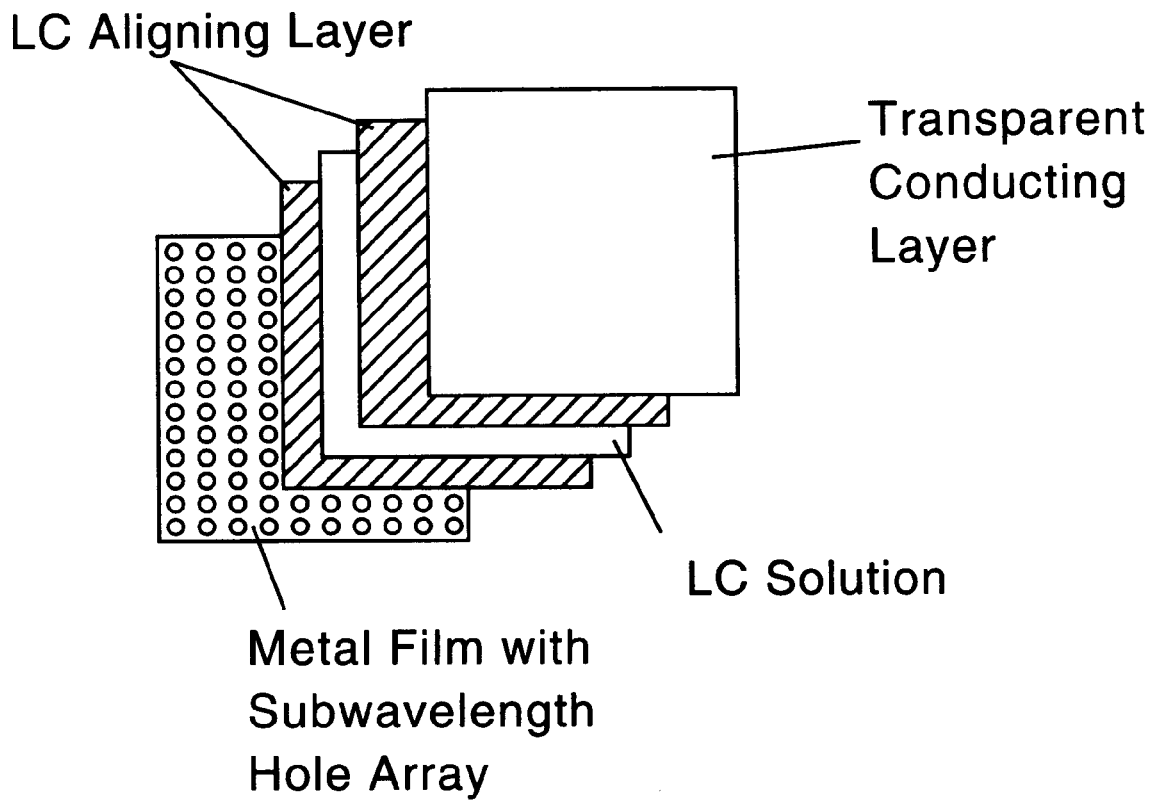
FIG. 4 is a schematic diagram of an optical transmission modulation apparatus constructed in accordance with the present invention.

An optical transmission modulation apparatus utilizing the phenomena described above will now be described. FIG. 4 is a schematic diagram of an optical transmission modulation apparatus which controls optical transmission through a perforated metal film unit by selectively varying the refractive index of a material substantially adjacent to the metal film (i.e. a portion of the supporting layer). A liquid crystal (LC) solution layer is sandwiched between a metal film perforated with an array of subwavelength-diameter holes and a transparent conducting layer. The metal film perforated with subwavelength-diameter holes is used as one electrode for the liquid crystal, while the transparent conducting layer is used as the other electrode. The transparent conducting layer may be comprised of any transparent, conductive material, and is preferably comprised of indium tin oxide (ITO). The LC solution layer is preferably encapsulated between two very thin LC aligning layers as shown in FIG. 4 which align the liquid crystals according to an electric field as is well-known in the art of liquid crystal displays. In addition, spacers on the order of micrometers, such as insulating microspheres for example, are preferably provided in the LC solution layer to maintain a slight spacing between the metal film and transparent conducting layer so as to avoid electrical shorting between the metal film and the transparent conducting layer. The LC solution layer, the LC aligning layers and the transparent conducting layer comprise a supporting layer which, in combination with the metal film, collectively comprise a perforated metal film unit as described above. The LC solution layer comprises the selectively variable refractive index portion of the support layer and is substantially adjacent to the metal film. Since the transmission through the perforated metal film unit strongly depends on the interface between the metal film and the neighboring media, it is important that the selectively variable refractive index portion of the supporting layer (in this example, the LC solution layer) be substantially adjacent to the metal film. The transparent conducting layer can be patterned, if desired, using standard photolithography as is well-known in the art so as to enable independent control of the refractive index of selected portions of the apparatus.

The optical transmission modulation apparatus shown in FIG. 4 provides electrical control of optical transmission through the array of holes in the perforated metal film. In particular, the intensity of light transmitted through the perforated metal film unit is controlled by varying the refractive index of the LC solution layer, which is in turn controlled by varying the electric voltage to the LC electrodes.

The inventors have performed experiments involving such optical transmission modulation apparatus, using samples of metal films perforated with an array of subwavelength-diameter holes, which metal films were similar to those described in previous work. See T. W. Ebbesen et al., supra; H. F. Ghaemi et al., supra. In a chromium film, thickness t=100 nm, on a quartz supporting layer, holes of diameter d=500 nm were fabricated using standard lithographic techniques. The holes were arranged on a regular square lattice with period P=1000 nm. In addition to this metal film, a twisted-nematic type liquid crystal (Merck E63, EM Industries, Inc.) was sandwiched between the perforated metal film and a prepared transparent conductive layer comprising ITO (produced by E.H.C. Co. Ltd., Japan) in the manner shown in FIG. 4. The ITO layer comprised one electrode for the liquid crystal, and the perforated metal film was used as the other electrode, separated from the ITO layer by 5–10 $\mu$m glass microsphere spacers to prevent shorting. To align the liquid crystal, an AC voltage of 0–12 V was applied at frequencies between 0.1–1 kHz, which could modulate the effective refractive index between n=1.52 and n=1.74.

It should be emphasized that in this experiment, the sole function of the liquid crystal was to provide a refractive index portion that is controllable (that is, selectively variable) through the application of an electric field. Other materials in which such a variation of the refractive index n can be achieved may also be used in the optical transmission modulation apparatus of the present invention, and may in fact be preferable over liquid crystals since the latter have a relatively long switching time due to the reorientation of molecules. For applications which require switching times less than about 1 ms, faster switching media (such as a semiconductor layer or a polymer electro-optic film, for example) are preferred. Ferro-electric liquid crystals can also be used to provide enhanced switching speed.

Figure 5:
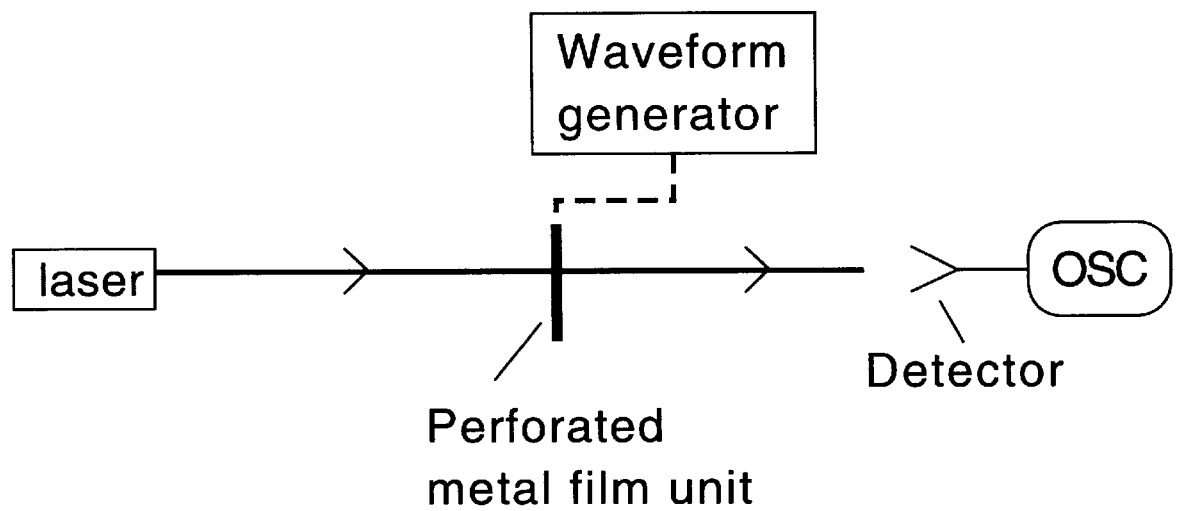
FIG. 5 is a schematic diagram depicting modulation of light transmitted through a perforated metal film unit using liquid crystal in accordance with the present invention.

The experimental arrangement for evaluating the performance of the experimental structure is shown in FIG. 5, in which light from a laser (having a wavelength of $\lambda$=1.55 $\mu$m) is directed onto the perforated metal film unit including the liquid crystal/ITO supporting layer. The light is incident normal to the surface of the perforated metal film unit. The intensity of the light transmitted through the perforated metal film unit is detected with detector including a photodiode, of which the output is recorded with a digital oscilloscope. The transmission is modulated by the application of an AC electric field over the liquid crystal cell by applying the voltage output of a waveform generator over the electrodes of the liquid crystal cell.

Figure 6:
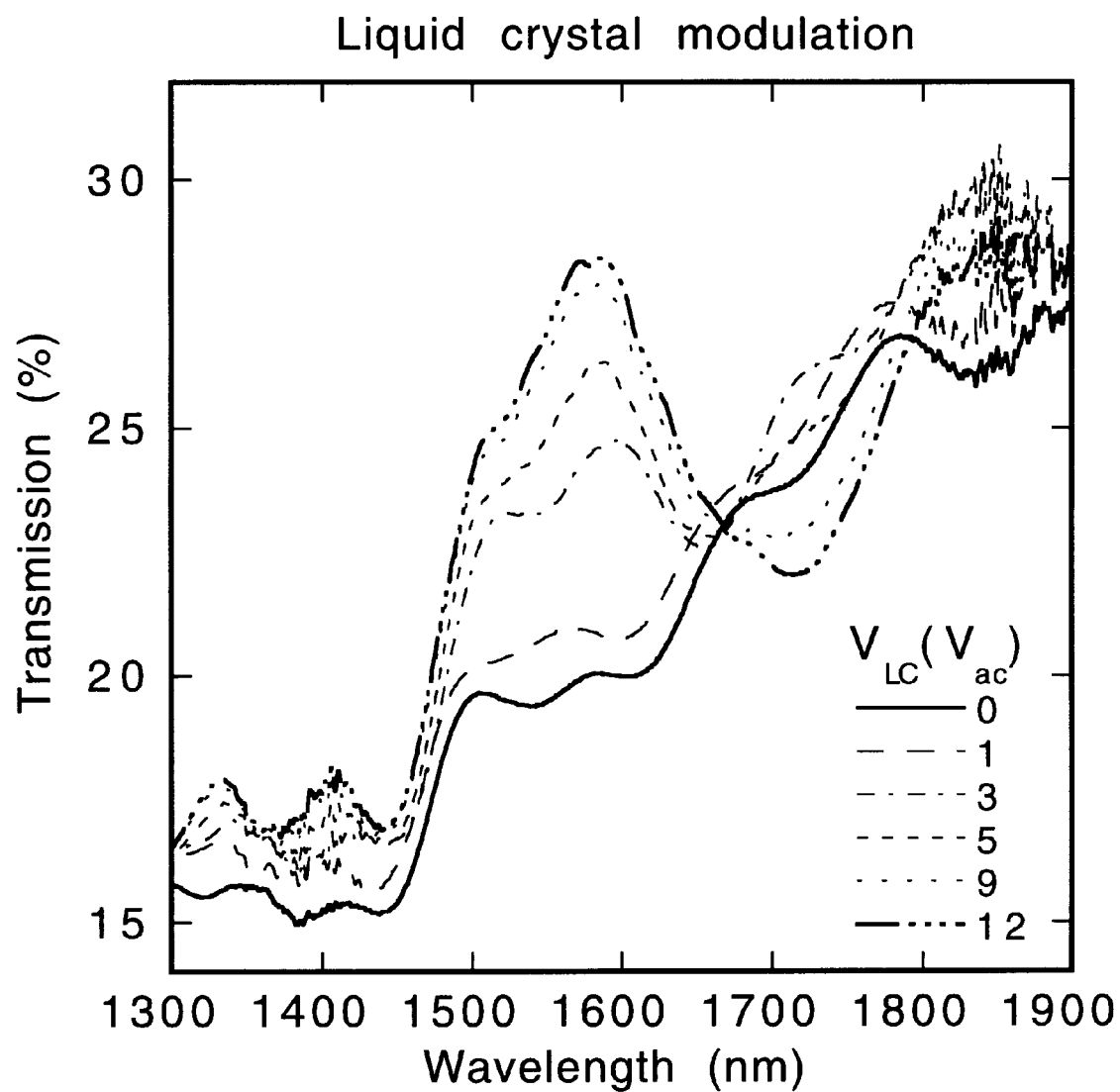
FIG. 6 is a graph showing transmission spectra (at normal incidence) of a chromium film with a subwavelength-diameter hole periodicity of P=1000 nm, a metal film thickness of t=100 nm, a hole diameter of d=500 nm, with a liquid crystal layer having a thickness of $d_{LC} \approx 12$ $\mu$m, the voltage applied to the liquid crystal being indicated in the legend.
Figure 7:
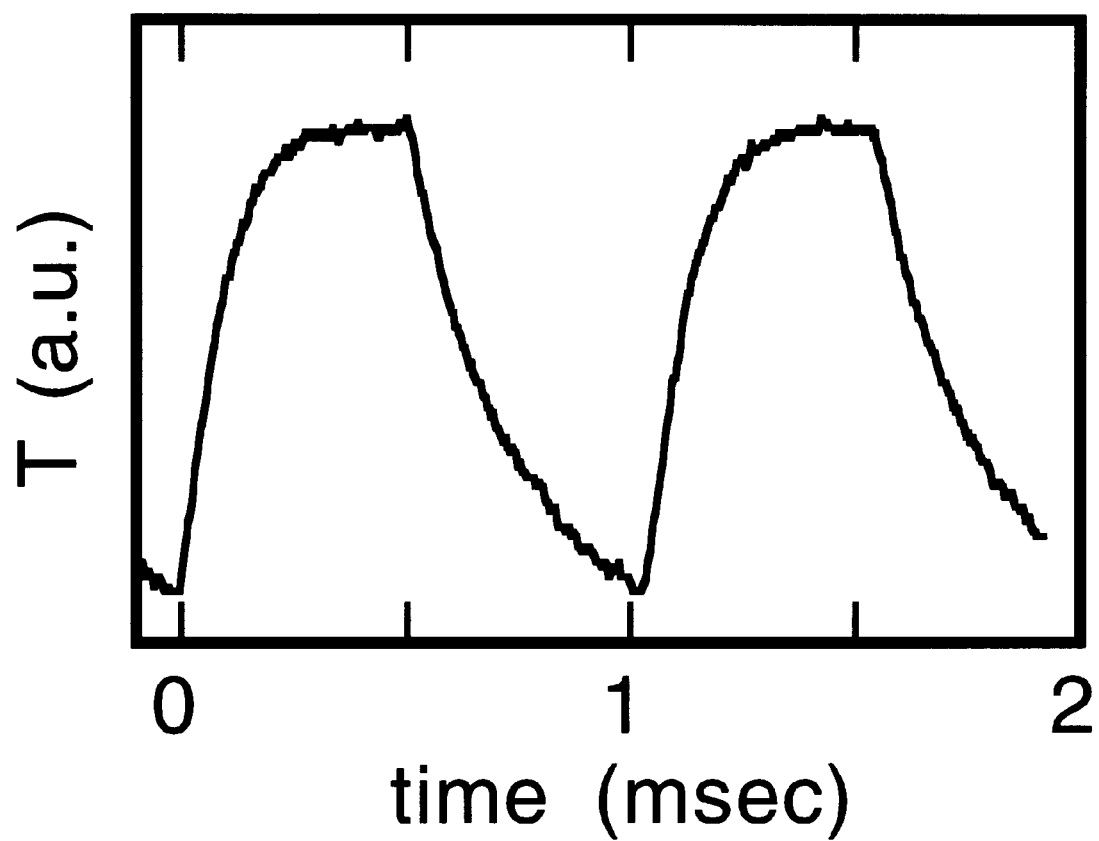
FIG. 7 is a graph showing time-dependent transmission of a 1.55 $\mu$m laser at normal incidence to a perforated metal film unit including a liquid crystal supporting layer in accordance with the present invention, the liquid crystal being modulated with a 12 V peak-to-peak voltage at a frequency of 1 kHz.

FIG. 6 shows the transmission spectra of the experimental perforated metal film unit described above, for various values of the AC voltage applied to the liquid crystal electrodes. The transmission spectra are quite broad because the diameter of the holes in the perforated metal film was relatively large. For this reason, the spectral shift is not immediately apparent in the data of FIG. 6. However, it is clear that at a fixed wavelength, the transmission amplitude is modulated by the variation of the voltage applied to the liquid crystal. This is shown explicitly in FIG. 7, which shows the time-dependent transmission signal (shown in arbitrary units) of a 1.55 $\mu$m laser and the modulated liquid crystal at 1 kHz, measured using the experimental arrangement shown in FIG. 5. The transmission modulation of this particular sample is approximately 25%, and is in phase with the driving voltage. The relatively small modulation amplitude is a consequence of the large hole diameter, which tends to broaden the minima associated with Wood's anomaly. In films with smaller holes, the features are sharper and the minima deeper, leading to higher contrast ratio as shown in FIG. 3 in which the hole diameter is d=150 nm and the thickness of the metal film is t=200 nm.

Optical Transmission Color Control Apparatus Using Geometry Variation

Figure 8:
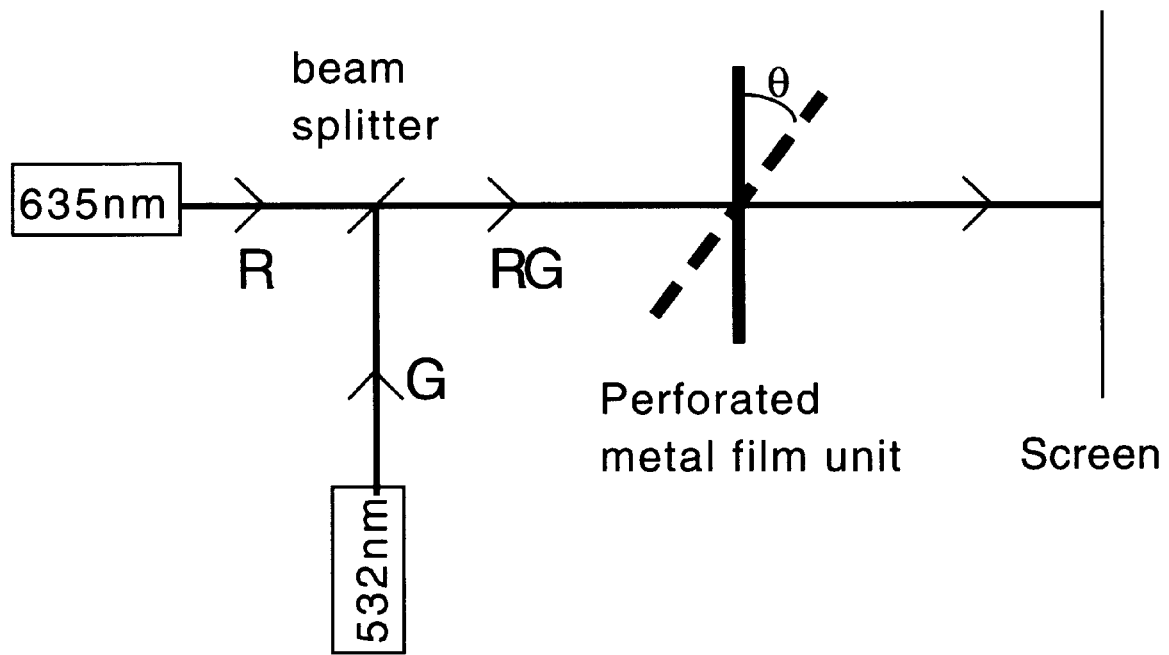
FIG. 8 is a schematic diagram depicting wavelength selection between red light having a wavelength of 635 nm and green light having a wavelength of 532 nm, effected by rotating a perforated metal film unit to change the angle of incidence of combined input light in accordance with the present invention.

Color control can also be achieved using an apparatus including a perforated metal film unit which enables the angle of incidence of incoming light to be changed (such as by rotating the perforated metal film unit with respect to the incoming light beam). An experimental unit of this type is shown in FIG. 8. A perforated metal film unit was constructed as follows. A metal film comprised of silver of thickness 300 nm was thermally evaporated onto a quartz substrate. The silver film was optically opaque. Subwavelength-diameter holes of 150 nm diameter were fabricated in the film using a Micrion 9500 Focused Ion Beam machine. The holes were arranged on a regular square lattice with a period P=400 nm. The metal film was used as part of a cell containing a liquid crystal in order to match the refractive index of the glass substrate. Red light R (wavelength 635 nm) and green light G (wavelength 532 nm) were directed into a beam splitter so that both lights are incident colinearly on the perforated metal film unit, which is rotated around a vertical axis to vary the angle of incidence $\theta$ of the incoming light to achieve color switching between red and green light, which color switching can be observed on the Screen. In addition, if the intensities of the two laser beams are of the correct proportions (which proportions are well-known in the art), at an intermediate angle the transmitted beam is perceived to be yellow due to additive color mixing.

Figure 9:
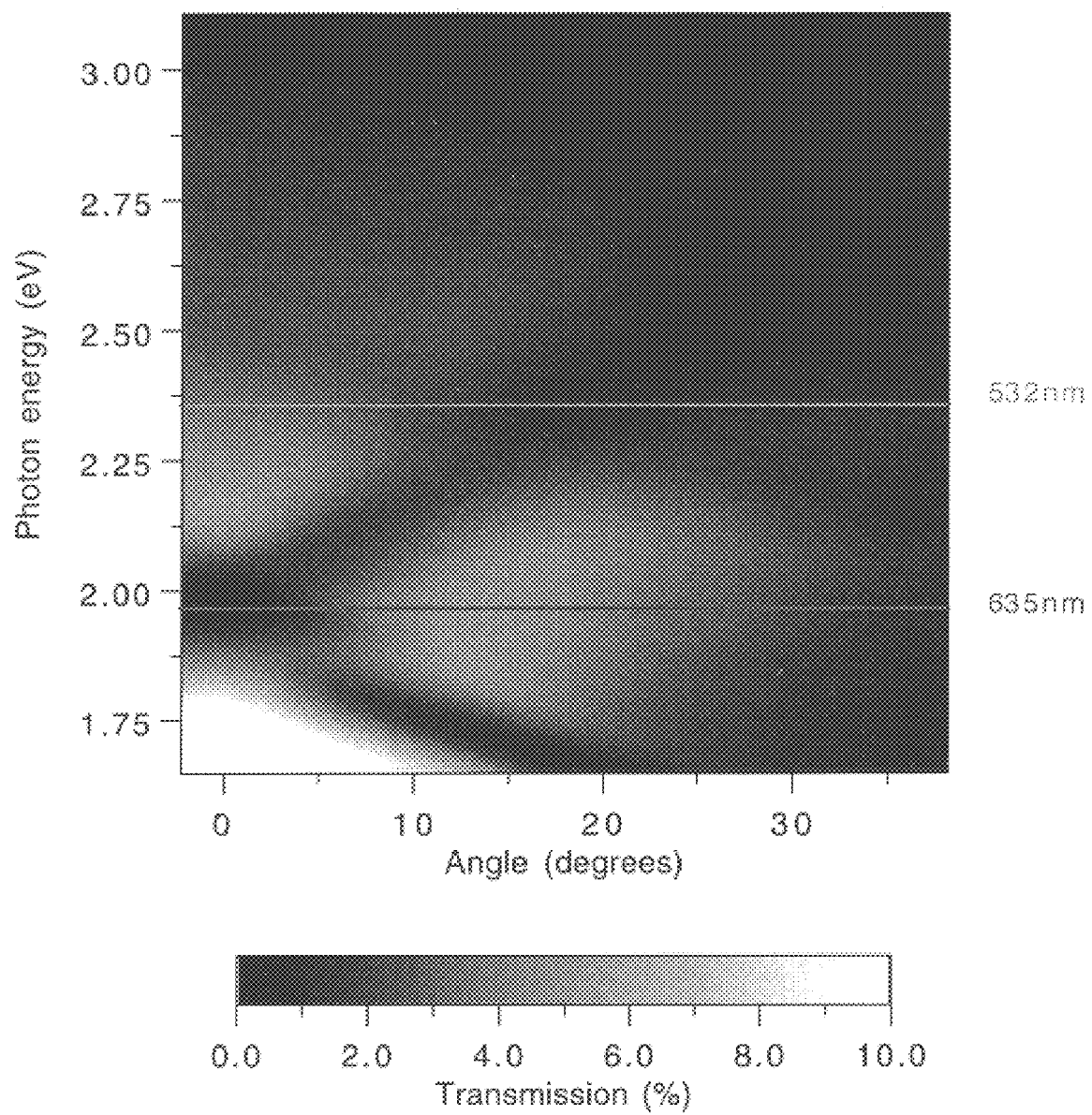
FIG. 9 is a graph showing transmission (in gray-scale) as a function of photon energy and incident angle θ, of a perforated metal film unit in accordance with the present invention, including a silver film having a thickness t=300 nm including subwavelength-diameter holes having a periodicity of P=400 nm and a diameter of d=150 nm.

FIG. 9 shows the transmitted intensity (on a gray scale) as a function of photon energy and angle of incidence. The dispersion is similar to that shown in the article by H. F. Ghaemi et al., supra, but it will be noted that in FIG. 9 the metal-air resonances are absent, both media (that is, the liquid crystal supporting layer and the quartz auxiliary layer) having an index close to 1.5. The two horizontal lines in FIG. 9 indicate the energies of two lasers, one at E=1.95 eV ($\lambda$=635 nm), the other at E=2.33 eV ($\lambda$=532 nm). A cut through the data of FIG. 9 along these two lines gives the angle dependence of the transmitted intensity at the two wavelengths, which is plotted in FIG. 10.

Figure 10:
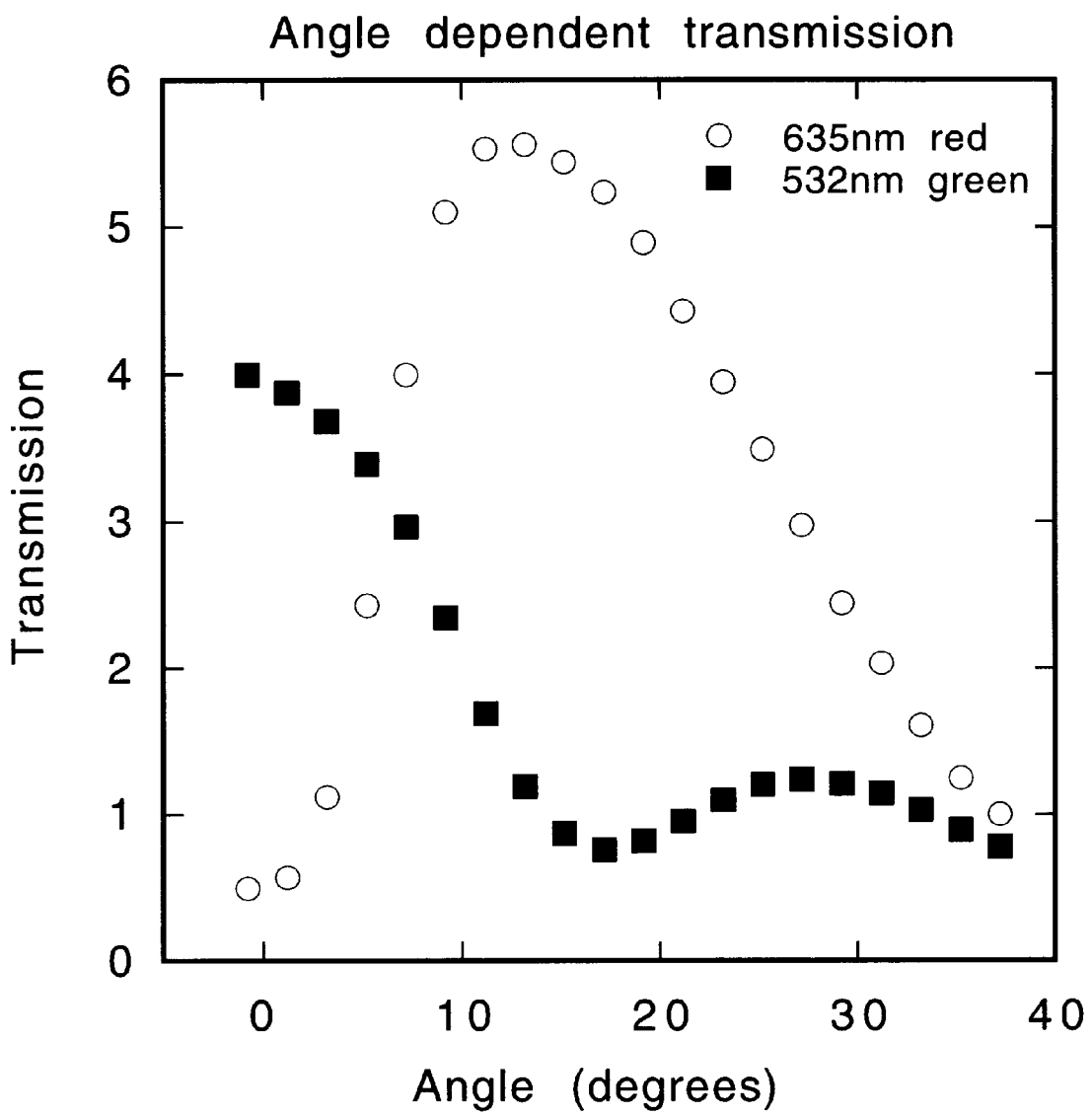
FIG. 10 is a graph showing transmission as a function of incident angle θ of the perforated metal film unit graphed in FIG. 9, the two photon energies indicated in the figure corresponding to λ=635 nm (open circles) and λ=532 nm (solid squares)

As shown in FIG. 10, the intensity of the red light at $\lambda$=635 nm is lowest at an angle of incidence $\theta$=0° and reaches a maximum at $\theta$=19°; the converse is true for the green light at $\lambda$=532 nm. By changing the angle $\theta$ between 0°–19° by rotating the perforated metal film unit (by using any type of adjuster, for example), it is possible to achieve switching between the two wavelengths with a contrast ratio of approximately 20:1, although the contrast ratio could be made higher by making the diameter of the holes smaller.

Flat Panel Display

Liquid crystal displays (LCDs) which are currently commercially available require a polarizer and analyzer to control transmitted light intensity. These polarizers represent an appreciable portion of the cost of materials and device assembly and add to the complexity of such displays. In addition, present LCDs require color filters to realize full color, resulting in a very low overall transmission of less than about 7%. Therefore, a very bright illuminating source is needed which consumes a substantial amount of electric power.

In contrast, the flat panel displays of the present invention, which are based on the controllability of the optical transmission through perforated metal films, need no polarizer, analyzer, or even color filters. The experimental results described above show very promising performances and advantages over prior art LCDs. Ideally, full color control with about 15–50% maximum transmission can be achieved with a properly designed geometry of the hole arrays in the perforated metal film. See T. W. Ebbesen et al., supra. Of course, a design tradeoff is inherent: high transmission can be achieved at the expense of lower wavelength resolution, or high wavelength resolution can be achieved at the expense of lower transmission. It should be noted that the term "flat panel display" includes not only displays which are flat in the sense of being planar, but, due to the mechanical flexibility which is possible with the apparatus of the present invention, the flat panel displays described and claimed herein include any flexible "thin film" type of display.

In general, the flat panel displays of the present invention may utilize perforated metal film units as described above to control intensity and/or color of transmitted light. The flat panel displays of the present invention may, for example, include the optical transmission modulation apparatus shown in FIG. 4 and described above. A fuller understanding of the flat panel displays encompassed by the present invention will be better understood with reference to FIGS. 11–13.

Figure 11:
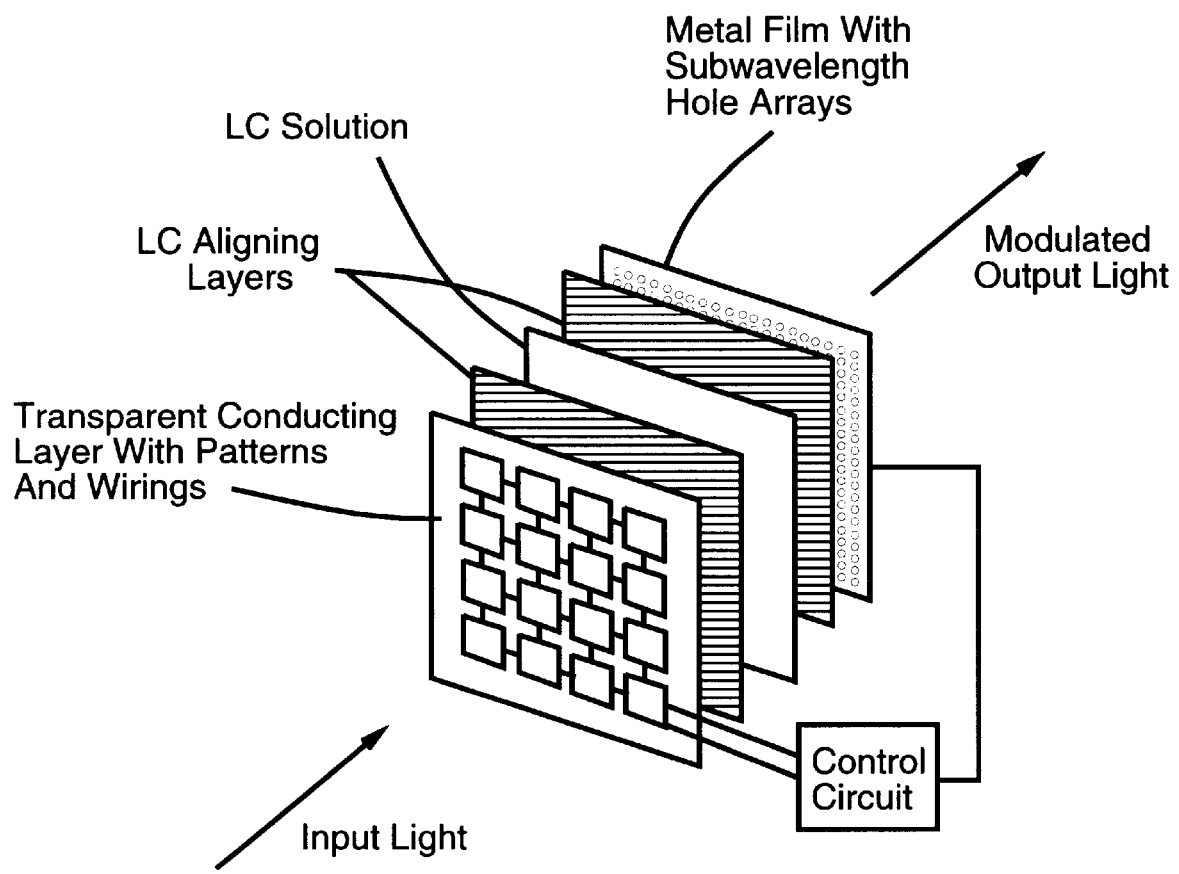
FIG. 11 is a perspective schematic diagram of a spatial light modulator constructed in accordance with the present invention.

FIG. 11 shows the details of a flat panel display based on surface-plasmon enhanced transmission through a perforated metal film. This flat panel display is similar to the previously described optical transmission modulation apparatus described above. A liquid crystal (LC) solution layer is sandwiched between a metal film perforated with an array of subwavelength-diameter holes and a transparent conducting layer. The metal film perforated with subwavelength holes is used as one electrode for the liquid crystal solution, while the transparent conducting layer is used as the other electrode. The metal film may be comprised of any metal, and certain degenerately doped semiconductors may also be used. The transparent conducting layer preferably comprises indium tin oxide (ITO), for example.

The LC solution layer is preferably encapsulated between two very thin LC aligning layers as shown in FIG. 11 to force the alignment of the liquid crystals so as to alter the liquid crystal refractive index. In addition, spacers on the order of micrometers, such as microspheres for example, are preferably provided in the LC solution layer to maintain a slight spacing between the metal film and transparent conducting layer to avoid electrical shorting between the metal film and the transparent conducting layer.

The transparent conducting layer may be patterned as desired to provide independent control over a plurality of discrete, independently controllable regions of the display, referred to as "display cells." To enable independent electrical control of the display cells, the transparent conducting layer is provided with wiring from a control unit to each display cell using standard photolithography and like processes, as is well-known in the art. The LC solution layer, the LC aligning layers and the transparent conducting layer comprise a supporting layer which, in combination with the metal film, collectively comprise a perforated metal film unit as described above. The LC solution layer comprises the selectively variable refractive index portion of the support layer and is substantially adjacent to the metal film. Since the transmission through the perforated metal film unit strongly depends on the interface between the metal film and the neighboring media, it is important that the selectively variable refractive index portion of the supporting layer (in this example, the LC solution layer) be substantially adjacent to the metal film. The control circuit enables independent, selective control of the voltage across the electrodes (the perforated metal film and the patterned transparent conductive layer) of each cell, which varies the alignment of the liquid crystals to provide selective control of the refractive index in each display cell, thereby modulating the transmission of light through each cell as described above.

FIGS. 12A and 12B further illustrate the flat panel display of the present invention. FIG. 12A is a cross-sectional diagram of one three-color (red, green and blue, or "RGB") pixel of a flat panel display of the present invention. White light from a light source 100 illuminates the perforated metal film 102 which is part of a cell containing a liquid crystal solution 104. Alignment layers 103 are provided to align the liquid crystal solution 104 in a well-defined direction. A transparent conductive layer 117 serves as the other electrode in the liquid crystal cell, and is patterned (such as shown in FIG. 11) such that each color of each pixel can be controlled independently, preferably utilizing conventional LCD drivers known as either simple or active matrix drives. The perforated metal film 102, liquid crystal solution 104, alignment layers 103 and transparent conductive layer 117 form a perforated metal film unit, in which the liquid crystal solution is substantially adjacent to the metal film. Substrates 101 and 118, onto which the perforated metal film 102 and transparent conductive electrode 117, respectively, are deposited, are auxiliary layers which serve to hold the cell together mechanically. Although not critical to the invention, the viewer's side of the supporting layer 118 (that is, the side through which the transmitted light is emitted) may be provided with a scattering medium (such as surface roughening, or frosting, in the case of glass) in order to maximize the viewing angle of the display if desired.

FIG. 12B is a plan view of the hole arrays in the perforated metal film for a single three-color (RGB) display pixel, such as that shown in FIG. 12A. For each color (R, G, and B), the subwavelength holes 112 are fabricated in a square array, each with a period ($P_R$, $P_G$, $P_B$) designed to match the desired wavelength of the transmitted light in accordance with Equation (3).

The cells of the flat panel display of the present invention allow electrical control of optical transmission through the array of holes in the perforated metal film as discussed above. That is, the intensity of light transmitted through the perforated metal film unit is controlled by selectively varying the refractive index of the liquid crystal, which is in turn controlled by varying the electric voltage to the LC electrodes. The color of light transmitted through the holes is controlled by creating the holes in the perforated metal film with holes of suitable size and periodicity according to Equation (3) above. In order to block the transmission of higher-order (i.e. shorter wavelength) transmission peaks, a long-pass filter can be used with an appropriate wavelength cutoff. At wavelengths longer than the cutoff, such filters have a transmission of about 90%.

Thus, a particular hole periodicity may be selected to create a display cell for each of the generally used red, green and blue display colors, and a wide apparent spectrum of colors may be obtained from each RGB pixel by controlling the intensity of light transmitted through the RGB display cells which are adjacent to one another in the pixel as is well-known in the art. The transmission modulation has been experimentally observed in pixels as small as 60 $\mu$m×30 $\mu$m, corresponding to a much higher resolution than that required for a high-definition display (typically about 250 $\mu$m). The method used for driving the display cells can be similar to either the simple matrix drive or the active matrix drive used in present LCD systems. The flat panel display of the present invention can be used with currently available illumination systems for commercial LCD displays, such as collimated line illumination or very thin electroluminescent (EL) panels, for example.

The overall thickness of this kind of flat panel display may be well below 1 inch including all the electronic control circuit boards and packaging. In fact, the display could be made thinner than 500 $\mu$m if a thin-sheet EL panel is used (250 $\mu$m, currently commercially available). By using a sheet of ITO on a plastic substrate (125 $\mu$m, also commercially available), a large display screen may be provided which is also flexible. The hole arrays can be manufactured for large-size displays using embossing holography technology. See J. J. Cowan, "Aztec surface-relief volume diffractive structure," *Journal of the Optical Society of America*, Vol. 7, No. 8, pp. 1529–1544 (Aug. 1990). As a result, such a thin display is suitable for large-screen high-definition television (HDTV).

An important benefit of the flat panel display of the present invention is that the overall transmission can be significantly higher than that of prior art flat panel display systems. In particular, flat panel display of the present invention exhibit at least 15% transmission for full color resolution. As a result, less power is required by the flat panel display of the present invention, which can therefore extend the battery life in a portable unit incorporating such a display (such as a laptop PC), for example. In addition, since the flat panel display of the present invention does not require a polarizer/analyzer system as used in prior art LCD systems, the manufacturing process can be made much simpler.

It should be noted that a liquid crystal exhibiting any change in refractive index in the presence of varied voltage is encompassed by the invention. In addition, the flat panel display of the present invention encompasses the use of any material or device exhibiting a selectively variable refractive index when disposed substantially adjacent to a metal film perforated with subwavelength-diameter holes, and is not merely confined to the use of liquid crystals.

Figure 13A:
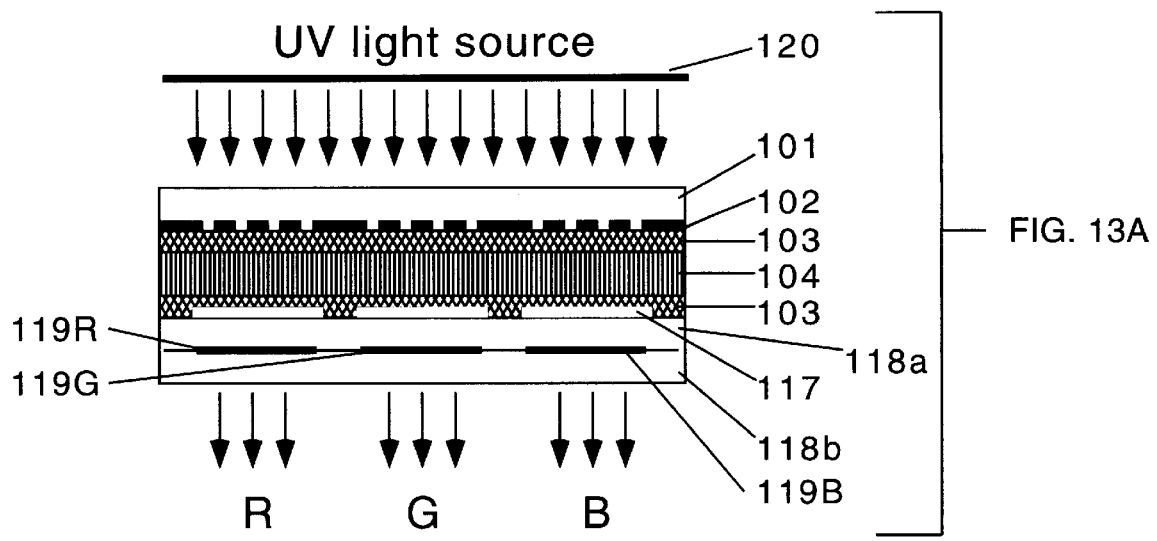
FIG. 13A is a cross-sectional view of one display pixel, comprising red, green and blue display cells, in a flat panel display of the present invention, which uses ultraviolet light and fluorescent dyes for color control.
Figure 13B:
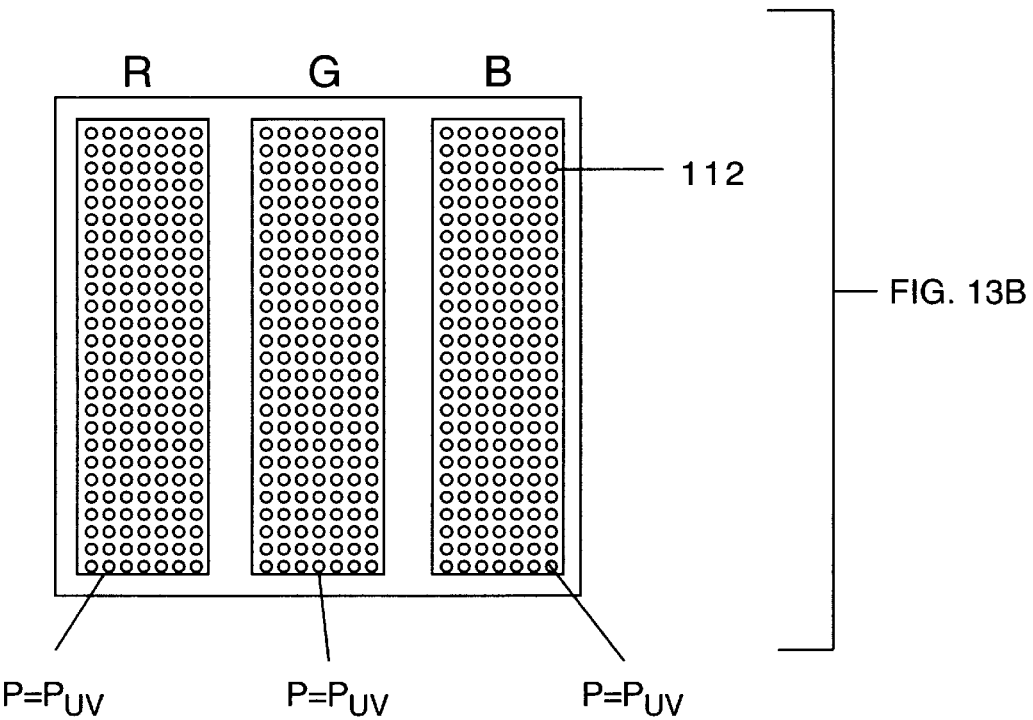
FIG. 13B is a plan view of the arrays of subwavelength-diameter holes provided in the perforated metal film for the display pixel shown in FIG. 13A.

The invention also encompasses a flat panel display in which color control is achieved by controlling the intensity of ultraviolet (UV) light which is made to excite a fluorescent dye, similar to the principle of a cathode ray tube (CRT), as shown in FIGS. 13A and 13B. FIG. 13A is a cross-sectional diagram of one three-color (RGB) display pixel using a light source with a single color in the ultraviolet range. UV light from the light source impinges on the perforated metal film 102, which again forms one electrode of a liquid crystal cell, with a transparent conductive layer 117 again serving as the other electrode. The layers 101, 102, 103 and 104 are identical to those shown in FIG. 12A. The transmitted light emerging from the transparent conductive layer 117 excites fluorescent dyes (119R, 119G, 119B) which emit light at a predetermined wavelengths appropriate to generate the RGB colors, similar to the operation of conventional cathode ray tube (CRT) displays. Auxiliary layers 118a and 118b are used to encapsulate the fluorescent dyes therebetween.

FIG. 13B is a plan view of the hole arrays in the perforated metal film for the single, three-color display pixel using UV illumination shown in FIG. 13A. The holes are fabricated on a square array as in the display pixel shown in FIG. 12B, but the period of all three arrays is the same ($P_{UV}$), and matches the incident UV wavelength according to Equation (3).

By designing adjacent display cells in the display pixel with red, green and blue fluorescent dyes, full RGB color and intensity control is provided. Moreover, by using fluorescent dyes which emit light isotropically, a large viewing angle may be provided. Furthermore, because only a single color is required from the light source, this type of inventive flat panel display is extremely efficient compared to a device which uses a white light source, since in the latter case most of the light produced by the white light source is not used.

Spatial Light Modulator

In addition to flat panel displays, the invention encompasses related but distinct devices known as spatial light modulators utilizing the perforated metal film units described hereinabove. In particular, a spatial light modulator may be constructed as shown in FIG. 11 and as described above in relation to that figure. While the spatial light modulator of the present invention is similar to the flat panel display cells described above, the LC layers in the spatial light modulator may be used to induce a refractive index change, or the LC layers may be replaced by a semiconductor layer or a polymer electro-optic film, for example, in order to achieve fast electro-optic modulation. In the case of a liquid-crystal medium, since it is not necessary to rotate the nematic LC molecules by 90° to control the light intensity, relatively high switching rates can be achieved. In fact, spatial light modulation using a surface plasmon resonance with a similar kind of nematic liquid crystal has been shown to be 50 times faster than bulk switching of the liquid crystal cells, with a display cell resolution of 10–20 $\mu$m and a contrast ratio better than 100:1. See E. M. Yeatman et al., "Spatial light modulation using surface plasmon resonance," *Applied Physics Letters*, Vol. 55, No. 7, pp. 613–615 (Aug. 14, 1989). The demonstration set forth in the Yeatman et al. article was achieved using the narrow reflected surface plasmon spectrum which was excited by the higher index prism coupling (attenuated total reflection).

The spatial light modulator of the present invention provides a similar effect, but operates in transmission mode by using metal films perforated with hole arrays. By appropriately selecting the geometry (hole diameter and hole array periodicity) and material for the perforated metal film, sharp transmission peaks can be obtained, and the transmission spectrum can therefore be made very narrow. As a result, the required refractive index change is small, requiring in turn a smaller angle of rotation of the liquid crystal molecules. Thus, the spatial light modulator using perforated metal films of the present invention offers high speed, high resolution and a high contrast ratio. Moreover, the transmission mode may have significant advantages over the reflection mode necessitated by the attenuated total reflection principle. For instance, since the effects described here are present in the zero-order transmitted light, modulation of the light requires no redirection of the beam path, as is the case for the reflection mode.

The actively controlled surface plasmon spatial light modulator of the present invention will provide advantages in many applications, including but not limited to the areas of image processing, optical interconnect networks, high speed laser light modulation for fiber optic communication, and 3-D holographic displays.

Tunable Optical Filter

When white light illuminates a perforated metal/electro-optic layer interface, the colors present in the transmitted light change as the incident angle is varied, as described above. The present invention further includes a tunable optical filter based on this color selectability.

Figure 14:
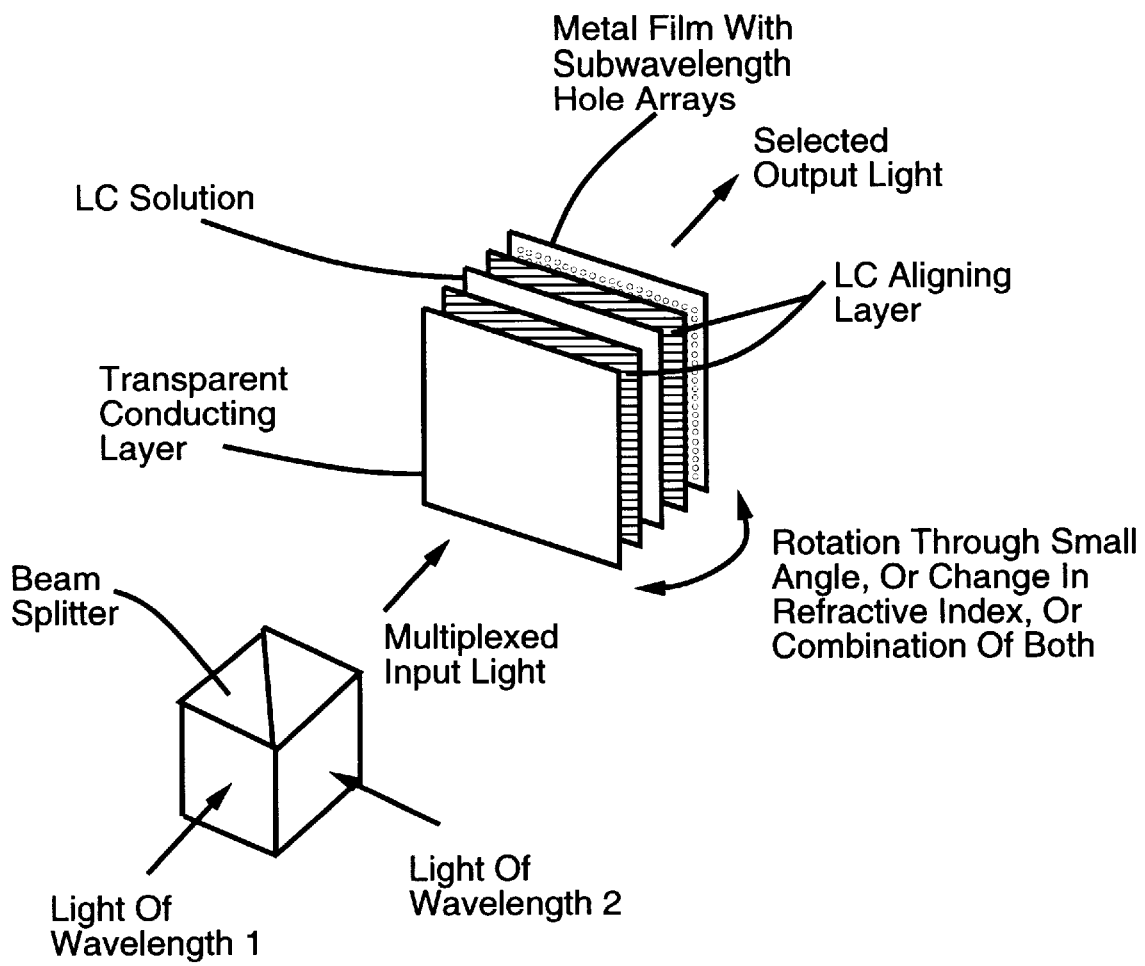
FIG. 14 is a perspective schematic diagram of a tunable optical filter constructed in accordance with the present invention.

FIG. 14 is a schematic diagram depicting a tunable optical filter according to the present invention which can select one wavelength from a two-wavelength input by rotating the perforated metal film structure so as to cause the light to impinge the structure at a predetermined angle of incidence. The tunable optical filter again utilizes a perforated metal film unit as described above. The perforated metal film unit may include liquid crystal (LC) sandwiched between a metal film perforated with subwavelength-diameter holes and a transparent conducting layer, which may be constructed as described above with respect to the flat panel display and spatial light modulator. Multiplexed input light is provided to the metal film/transparent conducting layer via a beam splitter, which is itself provided with light of a first wavelength (Wavelength 1) and light of a second wavelength (Wavelength 2) so that both the light of the first wavelength and the light of the second wavelength are provided as multiplexed input light which is incident colinearly on the perforated metal film unit. To tune the wavelength(s) of transmitted light, the perforated metal film unit is rotated (by an adjuster, not shown) through a relatively small angle, thereby causing the incident multiplexed input light to impinge the perforated metal film unit at a predetermined angle of incidence. The wavelength (and therefore the color) of light transmitted through the perforated metal film unit depends on the angle at which the perforated metal film unit is rotated, and selective optical tuning is therefore provided. The adjuster may comprise any mechanism for rotating the perforated metal film unit, and the particulars of the adjuster itself are not critical to the invention.

Although a liquid crystal embodiment is described here, the invention embraces tunable optical filters including perforated metal film units in which the supporting layer includes a portion comprising any material having a selectively variable refractive index, as discussed above regarding the optical transmission modulation apparatus using refractive index variation.

A large rotation angle may pose a mechanical limit for fast switching of a tunable optical filter on a macroscopic scale (e.g. where the largest linear dimension (width) is greater than or equal to about 1 mm). However, higher switching speeds can be achieved by miniaturizing, for example by using micro-electro-machining device technology as is well-known in the art.

The tunable optical filter of the present invention may also be designed to tune the color of the transmitted light by applying an electric field either to the liquid crystal or to a piezoelectric element used to rotate the perforated metal film unit as described above. Moreover, both tuning methods, by angle control and index control, may be combined in a single device as shown in FIG. 14. Such a tunable optical filter is useful for many applications including wavelength division multiplexing (WDM) for optical communications and image processing.

In conclusion, the apparatus of the invention described above which utilize a perforated metal film unit provide advantageous use in electro-optic devices due to at least the ability of such apparatus to control the intensity or wavelength of the light transmitted through the subwavelength-diameter hole arrays in the metal film. Since such control can be achieved at high speed, high throughput, and high contrast ratio, and without the need to redirect the optical beam, the apparatus of the present invention are important advances over the prior art.

While there has been described and illustrated herein optical transmission control apparatus utilizing metal films perforated with a periodic array of subwavelength-diameter holes, it will be apparent to those skilled in the art that further variations and modifications are possible without deviating from the broad teachings and spirit of the invention which shall be limited solely by the scope of the claims appended hereto.

What is claimed is:

1. An optical transmission modulation apparatus for modulating light transmitted through the apparatus, the apparatus comprising:

a metal film having a periodic array of subwavelength-diameter holes provided therein; and a supporting layer, at least a portion of the supporting layer having a selectively variable refractive index, the selectively variable refractive index portion being substantially adjacent to the metal film such that the metal film and the supporting layer comprise a perforated metal film unit, and wherein selective variation of the refractive index of the selectively variable refractive index portion modulates the intensity of the light transmitted through the perforated metal film unit without substantially changing the direction of the light.

2. The optical transmission modulation apparatus of claim 1, wherein the selectively variable refractive index portion of the supporting layer is in direct contact with the metal film.

3. The optical transmission modulation apparatus of claim 1, wherein the selectively variable refractive index portion of the supporting layer is in close proximity to the metal film.

4. The optical transmission modulation apparatus of claim 1, wherein the metal film is separated from the selectively variable refractive index portion of the supporting layer by a gap having a length and including a medium, the length of the gap being less than the depth at which surface plasmons of the metal film surface penetrate the medium in the gap.

5. The optical transmission modulation apparatus of claim 4, wherein the medium in the gap is selected from the group consisting of a vacuum, air, and optically transparent dielectric materials.

6. The optical transmission modulation apparatus of claim 1, wherein the selectively variable refractive index portion of the supporting layer comprises liquid crystal having an effective refractive index, wherein the effective refractive index of the liquid crystal is selectively variable by selectively applying an electric voltage to the liquid crystal.

7. The optical transmission modulation apparatus of claim 6, wherein the supporting layer further comprises a transparent conducting layer, and wherein the liquid crystal is provided between the transparent conducting layer and the metal film, such that the metal film comprises one electrode for selectively applying the voltage to the liquid crystal, and the transparent conducting layer comprises another electrode for selectively applying the voltage to the liquid crystal.

8. The optical transmission modulation apparatus of claim 7, wherein the supporting layer further comprises at least two liquid crystal alignment layers, a first liquid crystal alignment layer being provided between the transparent conducting layer and the liquid crystal, and a second liquid crystal alignment layer being provided between the liquid crystal and the metal film.

9. The optical transmission modulation apparatus of claim 1, wherein the selectively variable refractive index portion of the supporting layer comprises a material selected from the group consisting of a semiconductor layer and a polymer electro-optic film.

10. The optical transmission modulation apparatus of claim 1, further comprising an adjuster selectively adjusting the angle of the perforated metal film unit with respect to light incident on the perforated metal film unit, whereby adjusting the angle of the perforated metal film unit selectively controls the angle of incidence of the incident light so that, for a particular angle of incidence of the incident light with respect to the perforated metal film unit, light of only a predetermined range of wavelengths is transmitted through the perforated metal film unit.

11. The optical transmission modulation apparatus of claim 1, wherein the periodicity and diameter of the array of holes are selected so that, for a particular angle of incidence of the incident light with respect to the perforated metal film unit, light of only a predetermined color is transmitted through the perforated metal film unit.

12. The optical transmission modulation apparatus of claim 1, wherein the perforated metal film unit is substantially rigid.

13. The optical transmission modulation apparatus of claim 1, wherein the perforated metal film unit is substantially flexible.

14. A flat panel display having a plurality of display cells, the flat panel display comprising:
  a light source;
  a metal film having a periodic array of subwavelength-diameter holes provided therein; and
  a supporting layer, at least a portion of the supporting layer having a refractive index which is selectively variable for each display cell, the selectively variable refractive index portion being substantially adjacent to the metal film such that the metal film and the supporting layer comprise a perforated metal film unit, and wherein selective variation of the refractive index of the selectively variable refractive index portion modulates the intensity of light emitted by the light source which is transmitted through the perforated metal film unit for each display cell.

15. The flat panel display of claim 14, wherein the selectively variable refractive index portion of the supporting layer is in direct contact with the metal film.

16. The flat panel display of claim 14, wherein the selectively variable refractive index portion of the supporting layer is in close proximity to the metal film.

17. The flat panel display of claim 14, wherein the metal film is separated from the selectively variable refractive index portion of the supporting layer by a gap having a length and including a medium, the length of the gap being less than the depth at which surface plasmons of the metal film surface penetrate the medium in the gap.

18. The flat panel display of claim 17, wherein the medium in the gap is selected from the group consisting of a vacuum, air, and optically transparent dielectric materials.

19. The flat panel display of claim 14, wherein the selectively variable refractive index portion of the supporting layer comprises liquid crystal having an effective refractive index, wherein the effective refractive index of the liquid crystal is selectively variable for each display cell by selectively applying an electric voltage to the liquid crystal corresponding to each display cell.

20. The flat panel display of claim 19, wherein the supporting layer further comprises a transparent conducting layer, and wherein the liquid crystal is provided between the transparent conducting layer and the metal film, such that the metal film comprises one electrode for selectively applying the voltage to the liquid crystal for each display cell, and the transparent conducting layer comprises another electrode for selectively applying the voltage to the liquid crystal for each display cell.

21. The flat panel display of claim 20, wherein the supporting layer further comprises at least two liquid crystal alignment layers, a first liquid crystal alignment layer being provided between the transparent conducting layer and the liquid crystal, and a second liquid crystal alignment layer being provided between the liquid crystal and the metal film.

22. The flat panel display of claim 14, wherein the selectively variable refractive index portion of the supporting layer comprises a material selected from the group consisting of a semiconductor layer and a polymer electro-optic film.

23. The flat panel display of claim 14, wherein the periodicity and diameter of the array of holes are selected so that, for a particular angle of incidence of the incident light with respect to the perforated metal film unit, light of only a predetermined range of wavelengths is transmitted through each display cell.

24. The flat panel display of claim 14, wherein the periodicity and diameter of the array of holes for each display cell are selected so that, for a particular angle of incidence of the incident light with respect to the perforated metal film unit, light of only a predetermined color is transmitted through each display cell.

25. The flat panel display of claim 24, wherein the predetermined color of light transmitted through each display cell is one of red, green and blue.

26. The flat panel display of claim 14, wherein the light source is an ultraviolet light source, and wherein the supporting layer further comprises at least one fluorescent dye, one fluorescent dye being provided for each display cell, such that the light transmitted through the metal film excites the fluorescent dye so as to emit light of a predetermined color from each display cell.

27. The flat panel display of claim 26, wherein the periodicity and diameter of the array of holes are the same for every display cell and are selected such that the light transmitted into the fluorescent dye of each display cell matches the incident ultraviolet wavelength of the fluorescent dye of that display cell.

28. The flat panel display of claim 14, wherein the perforated metal film unit is substantially rigid.

29. The flat panel display of claim 14, wherein the perforated metal film unit is substantially flexible.

30. A spatial light modulator having a plurality of cells and modulating the intensity of incident light as the light is transmitted through each cell of the modulator, the spatial light modulator comprising:

a metal film having a periodic array of subwavelength-diameter holes provided therein; and a supporting layer, at least a portion of the supporting layer having a refractive index which is selectively variable for each cell, the selectively variable refractive index portion being substantially adjacent to the metal film such that the metal film and the supporting layer comprise a perforated metal film unit, and wherein selective variation of the refractive index of the selectively variable refractive index portion of the supporting layer modulates the intensity of light transmitted through the perforated metal film unit for each cell without substantially changing the direction of the light.

31. The spatial light modulator of claim 30, wherein the selectively variable refractive index portion of the supporting layer is in direct contact with the metal film.

32. The spatial light modulator of claim 30, wherein the selectively variable refractive index portion of the supporting layer is in close proximity to the metal film.

33. The spatial light modulator of claim 30, wherein the metal film is separated from the selectively variable refractive index portion of the supporting layer by a gap having a length and including a medium, the length of the gap being less than the depth at which surface plasmons of the metal film surface penetrate the medium in the gap.

34. The spatial light modulator of claim 33, wherein the medium in the gap is selected from the group consisting of a vacuum, air, and optically transparent dielectric materials.

35. The spatial light modulator of claim 30, wherein the selectively variable refractive index portion of the supporting layer comprises liquid crystal having an effective refractive index, wherein the effective refractive index of the liquid crystal is selectively variable for each cell by selectively applying an electric voltage to the liquid crystal corresponding to each cell.

36. The spatial light modulator of claim 35, wherein the supporting layer further comprises a transparent conducting layer, and wherein the liquid crystal is provided between the transparent conducting layer and the metal film, such that the metal film comprises one electrode for selectively applying the voltage to the liquid crystal for each cell, and the transparent conducting layer comprises another electrode for selectively applying the voltage to the liquid crystal for each cell.

37. The spatial light modulator of claim 36, wherein the supporting layer further comprises at least two liquid crystal alignment layers, a first liquid crystal alignment layer being provided between the transparent conducting layer and the liquid crystal, and a second liquid crystal alignment layer being provided between the liquid crystal and the metal film.

38. The spatial light modulator of claim 30, wherein the selectively variable refractive index portion of the supporting layer comprises a material selected from the group consisting of a semiconductor layer and a polymer electro-optic film.

39. The spatial light modulator of claim 30, wherein the periodicity and diameter of the array of holes are selected so that, for a particular angle of incidence of the incident light with respect to the perforated metal film unit, light of only a predetermined range of wavelengths is transmitted through each cell.

40. The spatial light modulator of claim 30, wherein the periodicity and diameter of the array of holes are selected so that, for a particular angle of incidence of the incident light with respect to the perforated metal film unit, light of only a predetermined color is transmitted through each cell.

41. The spatial light modulator of claim 30, further comprising an adjuster selectively adjusting the angle of the perforated metal film unit with respect to light incident on the perforated metal film unit, whereby adjusting the angle of the perforated metal film unit selectively controls the angle of incidence of the incident light so that, for a particular angle of incidence of the incident light with respect to the perforated metal film unit, light of only a predetermined range of wavelengths is transmitted through each cell.

42. The spatial light modulator of claim 30, wherein the perforated metal film unit is substantially rigid.

43. The spatial light modulator of claim 30, wherein the perforated metal film unit is substantially flexible.

44. A tunable optical filter for modulating the intensity of incident light as the light is transmitted through the tunable optical filter, the tunable optical filter comprising:

a metal film having a periodic array of subwavelength-diameter holes provided therein; and a supporting layer, at least a portion of the supporting layer having a selectively variable refractive index, the selectively variable refractive index portion being substantially adjacent to the metal film such that the metal film and the supporting layer comprise a perforated metal film unit, and wherein selective variation of the refractive index of the selectively variable refractive index portion of the supporting layer modulates the intensity of light transmitted through the perforated metal film unit without substantially changing the direction of the light.

45. The tunable optical filter of claim 44, wherein the selectively variable refractive index portion of the supporting layer is in direct contact with the metal film.

46. The tunable optical filter of claim 44, wherein the selectively variable refractive index portion of the supporting layer is in close proximity to the metal film.

47. The tunable optical filter of claim 44, wherein the metal film is separated from the selectively variable refractive index portion of the supporting layer by a gap having a length and including a medium, the length of the gap being less than the depth at which surface plasmons of the metal film surface penetrate the medium in the gap.

48. The tunable optical filter of claim 47, wherein the medium in the gap is selected from the group consisting of a vacuum, air, and optically transparent dielectric materials.

49. The tunable optical filter of claim 44, wherein the selectively variable refractive index portion of the supporting layer comprises liquid crystal having an effective refractive index, wherein the effective refractive index of the liquid crystal is selectively variable by selectively applying an electric voltage to the liquid crystal.

50. The tunable optical filter of claim 49, wherein the supporting layer further comprises a transparent conducting layer, and wherein the liquid crystal is provided between the transparent conducting layer and the metal film, such that the metal film comprises one electrode for selectively applying the voltage to the liquid crystal, and the transparent conducting layer comprises another electrode for selectively applying the voltage to the liquid crystal.

51. The tunable optical filter of claim 50, wherein the supporting layer further comprises at least two liquid crystal alignment layers, a first liquid crystal alignment layer being provided between the transparent conducting layer and the liquid crystal, and a second liquid crystal alignment layer being provided between the liquid crystal and the metal film.

52. The tunable optical filter of claim 44, wherein the selectively variable refractive index portion of the supporting layer comprises a material selected from the group consisting of a semiconductor layer and a polymer electro-optic film.

53. The tunable optical filter of claim 44, wherein the periodicity and diameter of the array of holes are selected so that, for a particular angle of incidence of the incident light with respect to the perforated metal film unit, light of only a predetermined range of wavelengths is transmitted through the perforated metal film unit.

54. The tunable optical filter of claim 44, wherein the periodicity and diameter of the array of holes are selected so that, for a particular angle of incidence of the incident light with respect to the perforated metal film unit, light of only a predetermined color is transmitted through the perforated metal film unit.

55. The tunable optical filter of claim 44, further comprising an adjuster selectively adjusting the angle of the perforated metal film unit with respect to light incident on the perforated metal film unit, whereby adjusting the angle of the perforated metal film unit selectively controls the angle of incidence of the incident light so as to permit only light of a predetermined range of wavelengths to be transmitted through the perforated metal film unit.

56. The tunable optical filter of claim 44, wherein the perforated metal film unit is substantially rigid.

57. The tunable optical filter of claim 44, wherein the perforated metal film unit is substantially flexible.

58. A tunable optical filter having a plurality of cells and modulating the intensity of incident light as the light is transmitted through each cell of the tunable optical filter, the tunable optical filter comprising:

a metal film having a periodic array of subwavelength-diameter holes provided therein; and a supporting layer, at least a portion of the supporting layer having a refractive index which is selectively variable for each cell, the selectively variable refractive index portion being substantially adjacent to the metal film such that the metal film and the supporting layer comprise a perforated metal film unit, and wherein selective variation of the selectively variable refractive index portion of the refractive index of the supporting layer modulates the intensity of light transmitted through the perforated metal film unit for each cell without substantially changing the direction of the light.

59. The tunable optical filter of claim 58, wherein the selectively variable refractive index portion of the supporting layer is in direct contact with the metal film.

60. The tunable optical filter of claim 58, wherein the selectively variable refractive index portion of the supporting layer is in close proximity to the metal film.

61. The tunable optical filter of claim 58, wherein the metal film is separated from the selectively variable refractive index portion of the supporting layer by a gap having a length and including a medium, the length of the gap being less than the depth at which surface plasmons of the metal film surface penetrate the medium in the gap.

62. The tunable optical filter of claim 61, wherein the medium in the gap is selected from the group consisting of a vacuum, air, and optically transparent dielectric materials.

63. The tunable optical filter of claim 58, wherein the selectively variable refractive index portion of the supporting layer comprises liquid crystal having an effective refractive index, wherein the effective refractive index of the liquid crystal is selectively variable for each cell by selectively applying an electric voltage to the liquid crystal corresponding to each cell.

64. The tunable optical filter of claim 63, wherein the supporting layer further comprises a transparent conducting layer, and wherein the liquid crystal is provided between the transparent conducting layer and the metal film, such that the metal film comprises one electrode for selectively applying the voltage to the liquid crystal for each cell, and the transparent conducting layer comprises another electrode for selectively applying the voltage to the liquid crystal for each cell.

65. The tunable optical filter of claim 64, wherein the supporting layer further comprises at least two liquid crystal alignment layers, a first liquid crystal alignment layer being provided between the transparent conducting layer and the liquid crystal, and a second liquid crystal alignment layer being provided between the liquid crystal and the metal film.

66. The tunable optical filter of claim 58, wherein the selectively variable refractive index portion of the supporting layer comprises a material selected from the group consisting of a semiconductor layer and a polymer electro-optic film.

67. The tunable optical filter of claim 58, wherein the periodicity and diameter of the array of holes are selected so that, for a particular angle of incidence of the incident light with respect to the perforated metal film unit, light of only a predetermined range of wavelengths is transmitted through each cell.

68. The tunable optical filter of claim 58, wherein the periodicity and diameter of the array of holes are selected so that, for a particular angle of incidence of the incident light with respect to the perforated metal film unit, light of only a predetermined color is transmitted through each cell.

69. The tunable optical filter of claim 58, further comprising an adjuster selectively adjusting the angle of the perforated metal film unit with respect to light incident on the perforated metal film unit, whereby adjusting the angle of the perforated metal film unit selectively controls the angle of incidence of the incident light so as to permit only light of a predetermined range of wavelengths to be transmitted through each cell.

70. The tunable optical filter of claim 58, wherein the perforated metal film unit is substantially rigid.

71. The tunable optical filter of claim 58, wherein the perforated metal film unit is substantially flexible.

* * * * *